(12) United States Patent
Sturman

(10) Patent No.: US 7,954,472 B1
(45) Date of Patent: Jun. 7, 2011

(54) HIGH PERFORMANCE, LOW EMISSION ENGINES, MULTIPLE CYLINDER ENGINES AND OPERATING METHODS

(75) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 400 days.

(21) Appl. No.: 12/256,296

(22) Filed: Oct. 22, 2008

Related U.S. Application Data

(60) Provisional application No. 60/982,353, filed on Oct. 24, 2007.

(51) Int. Cl.
*F02M 23/04* (2006.01)

(52) U.S. Cl. ........................................ 123/299; 123/585

(58) Field of Classification Search .................. 123/299, 123/533, 585
See application file for complete search history.

(56) References Cited

U.S. PATENT DOCUMENTS

| | | | |
|---|---|---|---|
| 1,062,999 A | 5/1913 | Webb | |
| 2,058,705 A | 10/1936 | Maniscalco | |
| 3,209,737 A | 10/1965 | Omotehara et al. | |
| 3,532,121 A | 10/1970 | Sturman et al. | |
| 3,623,463 A | 11/1971 | De Vries | |
| 3,683,239 A | 8/1972 | Sturman | |
| 3,743,898 A | 7/1973 | Sturman | |
| 3,952,710 A | 4/1976 | Kawarada et al. | |
| 4,009,695 A | 3/1977 | Ule | |
| 4,159,699 A | 7/1979 | McCrum | |
| 4,162,662 A | 7/1979 | Melchior | |
| 4,192,265 A | 3/1980 | Amano | |
| 4,230,075 A | 10/1980 | Lowther | |
| 4,312,038 A | 1/1982 | Imai et al. | |
| 4,326,380 A | 4/1982 | Rittmaster et al. | |
| 4,396,037 A | 8/1983 | Wilcox | |

(Continued)

FOREIGN PATENT DOCUMENTS

DE 37 27 335 2/1988

(Continued)

OTHER PUBLICATIONS

Anderson, Mark D., et al., "Adaptive Lift Control for a Camless Electrohydraulic Valvetrain", *SAE* Paper No. 981029, U. of Illinois and Ford Motor Co., (Feb. 23, 1998).

(Continued)

*Primary Examiner* — Erick Solis
(74) *Attorney, Agent, or Firm* — Blakely Sokoloff Taylor & Zafman LLP

(57) ABSTRACT

High performance, low emission engines, multiple cylinder engines and operating methods based on compression ignition of a combustion chamber charge. In accordance with the methods, fuel is injected into the combustion chamber after the exhaust valve closes, and air is injected into the combustion cylinder before the end of the compression stroke in an amount to limit the temperature after ignition to less than the temperature at which $NO_x$ forms. After ignition and during the power stroke, more air is injected into the combustion chamber to sustain combustion until all fuel is consumed, the air being injected so as to again limit the combustion temperatures to less than the temperature at which $NO_x$ forms. The air injected during the compression stroke is injected at substantially the same combustion chamber pressure as the air injected during the power stroke, so that air may efficiently be injected from the same pressurized source. The fuel injected into the combustion chamber may be all the fuel needed, or additional fuel may be injected during the power stoke.

25 Claims, 12 Drawing Sheets

U.S. PATENT DOCUMENTS

| | | | |
|---|---|---|---|
| 4,409,638 | A | 10/1983 | Sturman et al. |
| RE32,163 | E | 5/1986 | Tokuda et al. |
| 4,779,582 | A | 10/1988 | Lequesne |
| 4,783,966 | A | 11/1988 | Aldrich |
| 4,887,562 | A | 12/1989 | Wakeman |
| 4,930,464 | A | 6/1990 | Letsche |
| 5,003,937 | A | 4/1991 | Matsumoto et al. |
| 5,022,358 | A | 6/1991 | Richeson |
| 5,121,730 | A | 6/1992 | Ausman et al. |
| 5,124,598 | A | 6/1992 | Kawamura |
| 5,170,755 | A | 12/1992 | Kano et al. |
| 5,193,495 | A | 3/1993 | Wood, III |
| 5,209,453 | A | 5/1993 | Aota et al. |
| 5,224,683 | A | 7/1993 | Richeson |
| 5,237,968 | A | 8/1993 | Miller et al. |
| 5,237,976 | A | 8/1993 | Lawrence et al. |
| 5,248,123 | A | 9/1993 | Richeson et al. |
| 5,255,641 | A | 10/1993 | Schechter |
| 5,275,134 | A | 1/1994 | Springer |
| 5,275,136 | A | 1/1994 | Schechter et al. |
| 5,327,856 | A | 7/1994 | Schroeder et al. |
| 5,335,633 | A | 8/1994 | Thien |
| 5,339,777 | A | 8/1994 | Cannon |
| 5,367,990 | A | 11/1994 | Schechter |
| 5,373,817 | A | 12/1994 | Schechter et al. |
| 5,408,975 | A | 4/1995 | Blakeslee et al. |
| 5,410,994 | A | 5/1995 | Schechter |
| 5,419,492 | A | 5/1995 | Gant et al. |
| 5,421,521 | A | 6/1995 | Gibson et al. |
| 5,448,973 | A | 9/1995 | Meyer |
| 5,460,329 | A | 10/1995 | Sturman |
| 5,463,996 | A | 11/1995 | Maley et al. |
| 5,471,959 | A | 12/1995 | Sturman |
| 5,494,219 | A | 2/1996 | Maley et al. |
| 5,499,605 | A | 3/1996 | Thring |
| 5,507,316 | A | 4/1996 | Meyer |
| 5,526,778 | A | 6/1996 | Springer |
| 5,546,897 | A | 8/1996 | Brackett |
| 5,551,398 | A | 9/1996 | Gibson et al. |
| 5,572,961 | A | 11/1996 | Schechter et al. |
| 5,577,468 | A | 11/1996 | Weber |
| 5,598,871 | A | 2/1997 | Sturman et al. |
| 5,622,152 | A | 4/1997 | Ishida |
| 5,628,293 | A | 5/1997 | Gibson et al. |
| 5,638,781 | A | 6/1997 | Sturman |
| 5,640,987 | A | 6/1997 | Sturman |
| 5,669,355 | A | 9/1997 | Gibson et al. |
| 5,673,669 | A | 10/1997 | Maley et al. |
| 5,682,858 | A | 11/1997 | Chen et al. |
| 5,687,693 | A | 11/1997 | Chen et al. |
| 5,697,342 | A | 12/1997 | Anderson et al. |
| 5,700,136 | A | 12/1997 | Sturman |
| 5,713,316 | A | 2/1998 | Sturman |
| 5,720,261 | A | 2/1998 | Sturman et al. |
| 5,732,677 | A | 3/1998 | Baca |
| 5,738,075 | A | 4/1998 | Chen et al. |
| 5,752,659 | A | 5/1998 | Moncelle |
| 5,813,841 | A | 9/1998 | Sturman |
| 5,829,396 | A | 11/1998 | Sturman |
| 5,857,436 | A | 1/1999 | Chen |
| 5,873,526 | A | 2/1999 | Cooke |
| 5,894,730 | A | 4/1999 | Mitchell |
| 5,937,799 | A | 8/1999 | Binion |
| 5,954,030 | A | 9/1999 | Sturman et al. |
| 5,960,753 | A | 10/1999 | Sturman |
| 5,970,956 | A | 10/1999 | Sturman |
| 5,979,803 | A | 11/1999 | Peters et al. |
| 6,005,763 | A | 12/1999 | North |
| 6,012,430 | A | 1/2000 | Cooke |
| 6,012,644 | A | 1/2000 | Sturman et al. |
| 6,105,616 | A | 8/2000 | Sturman et al. |
| 6,109,284 | A | 8/2000 | Johnson et al. |
| 6,148,778 | A | 11/2000 | Sturman |
| 6,173,567 | B1 * | 1/2001 | Poola et al. ..................... 60/274 |
| 6,173,685 | B1 | 1/2001 | Sturman |
| 6,318,310 | B1 | 11/2001 | Clarke |
| 6,352,056 | B1 | 3/2002 | Ruman |
| 6,412,706 | B1 | 7/2002 | Guerrassi et al. |
| 6,415,749 | B1 | 7/2002 | Sturman et al. |
| 6,543,411 | B2 | 4/2003 | Raab et al. |
| 6,575,384 | B2 | 6/2003 | Ricco |
| 6,592,050 | B2 | 7/2003 | Boecking |
| 6,655,355 | B2 | 12/2003 | Kropp et al. |
| 6,684,856 | B2 | 2/2004 | Tanabe et al. |
| 6,684,857 | B2 | 2/2004 | Boecking |
| 6,739,293 | B2 | 5/2004 | Turner et al. |
| 6,910,462 | B2 | 6/2005 | Sun et al. |
| 6,910,463 | B2 | 6/2005 | Oshizawa et al. |
| 6,939,517 | B2 * | 9/2005 | Ooe et al. ..................... 422/172 |
| 6,951,204 | B2 | 10/2005 | Shafer et al. |
| 6,951,211 | B2 | 10/2005 | Bryant |
| 6,994,077 | B2 | 2/2006 | Kobayashi et al. |
| 6,999,869 | B1 | 2/2006 | Gitlin et al. |
| 7,128,062 | B2 | 10/2006 | Kuo et al. |
| 7,314,043 | B1 * | 1/2008 | Berger et al. .................. 123/585 |
| 7,353,786 | B2 | 4/2008 | Scuderi et al. |
| 7,481,039 | B2 | 1/2009 | Surnilla et al. |
| 2001/0017123 | A1 | 8/2001 | Raab et al. |
| 2002/0166515 | A1 | 11/2002 | Ancimer et al. |
| 2003/0041593 | A1 | 3/2003 | Yoshida et al. |
| 2003/0226351 | A1 | 12/2003 | Glenn |
| 2004/0045536 | A1 | 3/2004 | Hafner et al. |
| 2004/0177837 | A1 | 9/2004 | Bryant |
| 2005/0072407 | A1 | 4/2005 | Yu |
| 2005/0098162 | A1 | 5/2005 | Bryant |
| 2006/0032940 | A1 | 2/2006 | Boecking |
| 2006/0243253 | A1 | 11/2006 | Knight |
| 2007/0245982 | A1 | 10/2007 | Sturman |
| 2008/0092860 | A2 | 4/2008 | Bryant |
| 2008/0275621 | A1 | 11/2008 | Kobayashi |
| 2009/0037085 | A1 | 2/2009 | Kojima |

FOREIGN PATENT DOCUMENTS

| | | |
|---|---|---|
| DE | 10239110 | 3/2004 |
| FR | 2901846 | 12/2007 |
| GB | 941453 | 11/1963 |
| GB | 2402169 | 12/2004 |
| JP | 60-035143 | 2/1985 |
| WO | WO-98/11334 | 3/1998 |
| WO | WO-01/46572 | 6/2001 |
| WO | WO-02/086297 | 10/2002 |

OTHER PUBLICATIONS

Blair, Gordon P., "Design and Simulation of Two-Stroke Engines", *SAE* Publications No. R-161, (1996), pp. 1-48.

Challen, Bernard, "Diesel Engine Reference Book Second Edition", *SAE* Publication No. R-183, (1999), pp. 27-71.

Cole, C., et al., "Application of Digital Valve Technology to Diesel Fuel Injection", *SAE* Paper No. 1999-01-0196. Sturman Industries, Inc., (Mar. 1, 1999).

Dickey, Daniel W., et al., "NOx Control in Heavy-Duty Diesel Engines—What is the Limit?" *In-Cylinder Diesel Particulate and NOx Control*, SAE Publication No. SP-1326, (1998), pp. 9-20.

Duret, P., "A New Generation of Two-Stroke Engines for the Year 2000", *A New Generation of Two-Stroke Engines for the Future?*, Paris, (1993), pp. 181-194.

Heisler, Heinz, "Vehicle and Engine Technology Second Edition", *SAE International*, London, (1999), pp. 292-308.

Kang, Kern Y., "Characteristics of Scavenging Flow in a Poppet-Valve Type 2-Stroke Diesel Engine by Using RSSV System", *Progress in Two-Stroke Engine and Emissions Control*, SAE Publication SP-1131, (1998), pp. 93-101.

Kim, Dean H., et al., "Dynamic Model of a Springless Electrohydraulic Valvetrain", *SAE Paper* No. 970248, U. of Illinois and Ford Research Company, (1997).

Misovec, Kathleen M., et al., "Digital Valve Technology Applied to the Control of an Hydraulic Valve Actuator", *SAE Paper* No. 1999-01-0825, Sturman Industries, Inc., (Mar. 1, 1999).

Nomura, K., et al., "Development of a New Two-Stroke Engine with Poppet-Valves: Toyota S-2 Engine", *A New Generation of Two-Stroke Engines for the Future?*, (1993), pp. 53-62.

Nuti, Marco, et al., "Twenty Years of Piaggio Direct Injection Research to Mass Produced Solution for Small 2T SI Engines",

*Two-Stroke Engines and Emissions*, SAE Publication SP-1327, (1998), pp. 65-78.

Osenga, Mike, "Cat's HEUI System: A Look at the Future?", *Diesel Progress*, (Apr. 1995), pp. 30-35.

Schechter, Michael M., et al., "Camless Engine", *SAE* Paper No. 960581, Ford Research Lab, (Feb. 26, 1996).

Sturman, Carol, et al., "Breakthrough in Digital Valves", *Machine Design*, (Feb. 21, 1994), pp. 37-42.

Wilson, Rob, "Developments In Digital Valve Technology", *Diesel Progress North American Edition*, (Apr. 1997), pp. 76, 78-79.

Wirbeleit, F., et al., "Stratified Diesel Fuel-Water-Diesel Fuel Injection Combined with EGR-The Most Efficient In-Cylinder NOx and PM Reduction Technology", *Combustion and Emissions in Diesel Engines*, SAE Publication No. SP-1299, (1997), pp. 39-44.

* cited by examiner

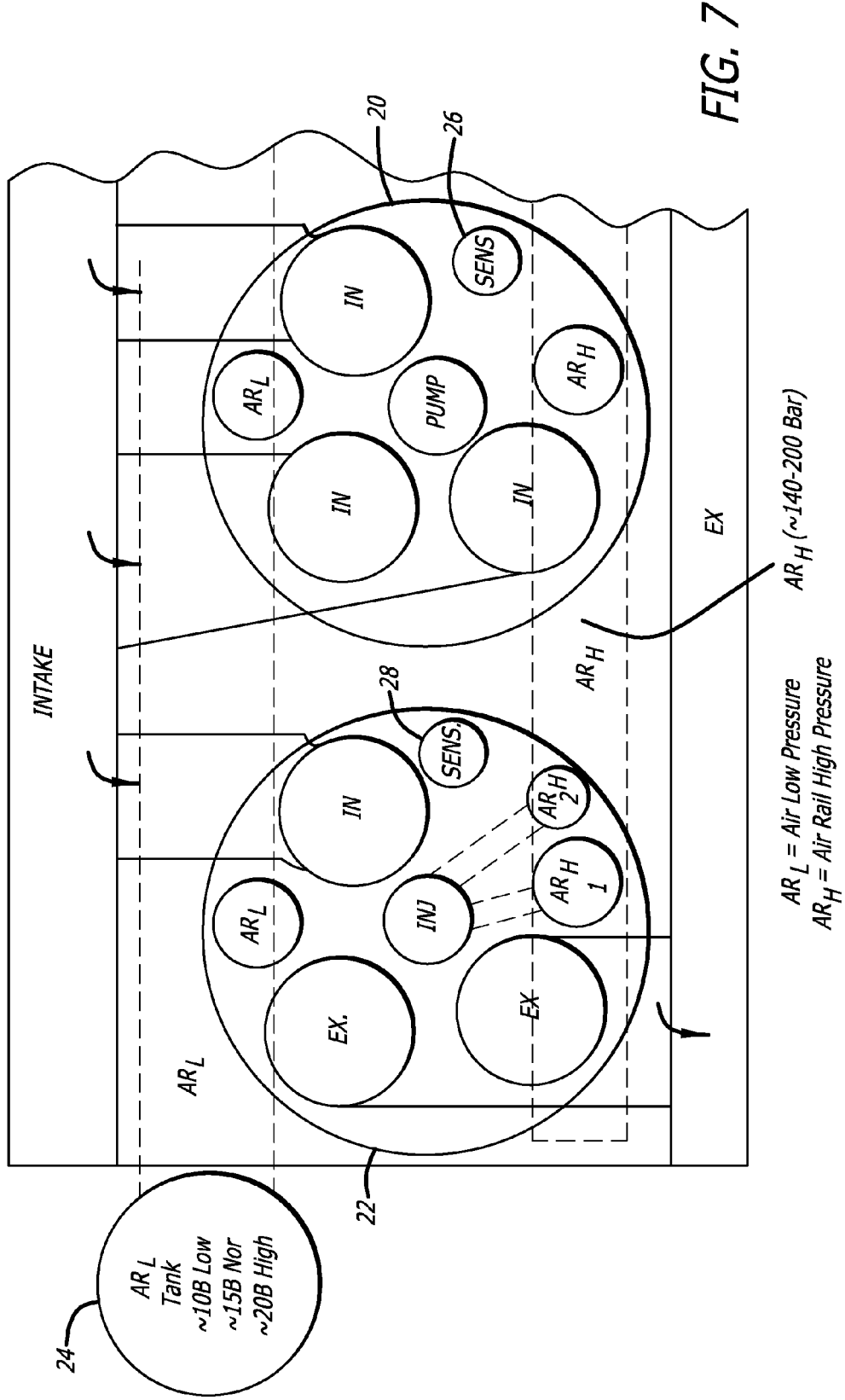

HIGH PERFORMANCE, LOW EMISSION ENGINES, MULTIPLE CYLINDER ENGINES AND OPERATING METHODS

CROSS-REFERENCE TO RELATED APPLICATION

This application claims the benefit of U.S. Provisional Patent Application No. 60/982,353 filed Oct. 24, 2007.

BACKGROUND OF THE INVENTION

1. Field of the Invention

The present invention relates to the field of internal combustion engines such as diesel engines, gasoline engines and engines designed to operate on alternate fuels.

2. Prior Art

The present invention is applicable to various types of engines, including diesel engines, gasoline engines and engines intended to operate on alternate fuels. However for purposes of specificity in the disclosure herein, preferred embodiments will first be described with respect to diesel engines, after which the applicability to other types of engines will be described. Accordingly, the prior art with respect to diesel engines will be described herein, it being understood that generally speaking, many of the characteristics of diesel engines described herein translate in various ways to other types of engines.

It is well known that the pollutants produced by diesel engines consist primarily of nitrous oxides ($NO_X$) and unburned hydrocarbons. It is also well known that nitrous oxides form above a particular temperature, or more importantly for the present invention, do not form below the nitrous oxide formation temperature limit. This temperature limit is significantly above the ignition temperature for a diesel fuel-air mixture, though in conventional diesel engines, local temperatures within the combustion chamber frequently exceed the nitrous oxide formation temperature limit for various reasons. The unburned hydrocarbons in a diesel engine exhaust, on the other hand, generally have two primary causes, namely first, the impingement of part of the spray of injected fuel on a relatively cool surface before the fuel has an opportunity to burn, or at least entirely burn, and second, the local injection of fuel into regions of the combustion chamber having inadequate oxygen to locally allow all of the injected fuel to burn. This second cause, of course, helps facilitate the former cause, as the fuel can't burn without adequate oxygen.

Preferably in a diesel engine, a small pre-injection of fuel is used to initiate combustion, with a main injection of fuel occurring shortly thereafter, starting at or near top dead center of the piston in the cylinder. When the piston is in its uppermost position, or near its uppermost position, the injection spray should not be downward onto the top of the piston, as that causes a high content of hydrocarbons in the diesel exhaust, as previously described, as well as possibly damaging the engine. However as the piston moves away from top dead center, the contents in the combustion chamber expand, with the center of those contents generally moving downward at half the rate of the piston. Accordingly, the continued fuel injection in a direction suitable for the top dead center position of the piston is injecting fuel only into the top layer, so to speak, of air in the combustion chamber. This has multiple adverse effects. The concentration of fuel in this limited volume can easily result in local temperatures exceeding the nitrous oxide formation temperature limit. Further, the oxygen in this limited region of the combustion chamber may be consumed, even though adequate oxygen is available therebelow, resulting in incomplete combustion of the fuel and substantial hydrocarbons in the exhaust. The only available control for these effects in prior art engines and operating methods is to try to limit the total injection in relation to the volume and oxygen content of that portion of the combustion chamber volume into which the fuel is injected, thereby providing a limit on the mechanical energy developed during that combustion cycle.

In one prior art injector, spray nozzles in multiple directions are used, with initial injection having a more radial component to better facilitate the proper injection when the piston is at or near top dead center, with a mechanical valve switching the injection flow to injection orifices projecting more toward the piston so that the injection of the fuel can better follow the majority of the remaining oxygen available for combustion. Such an injector could have meaningful advantages, such as in stationary engines operating under a constant load. However the fact that the control is mechanical and has preset limits, restricts its flexibility in engines such as truck engines and the like, which operate throughout a relatively wide range of engine speed and a very wide range of power output.

BRIEF DESCRIPTION OF THE DRAWINGS

FIG. 7 illustrates schematically the exemplary valving for two cylinders of the engine, the right cylinder in this Figure being used for compression and the left cylinder being used as a combustion or power cylinder.

DETAILED DESCRIPTION OF THE PREFERRED EMBODIMENTS

In one embodiment of the invention, both fuel and air are injected into the combustion chamber during at least some of the main injection of fuel. The air is preferably injected into the region surrounding the fuel injector tip so that a fresh supply of oxygen rich air is provided during main injection, even as the piston moves away from the injector, and thus the center of the remaining previously available air, so to speak, also moves away from the injector. This can provide more complete combustion of the fuel injected during main injection and can further allow the injection and combustion of greater amounts of fuel over the same or a greater crankshaft angle, thereby increasing the energy output of that combustion cycle. Further, by careful control of the air, and particularly the fuel injected during pre-injection and main injection, combustion temperatures may be kept below the nitrous oxide formation temperature limit.

Figure 1:
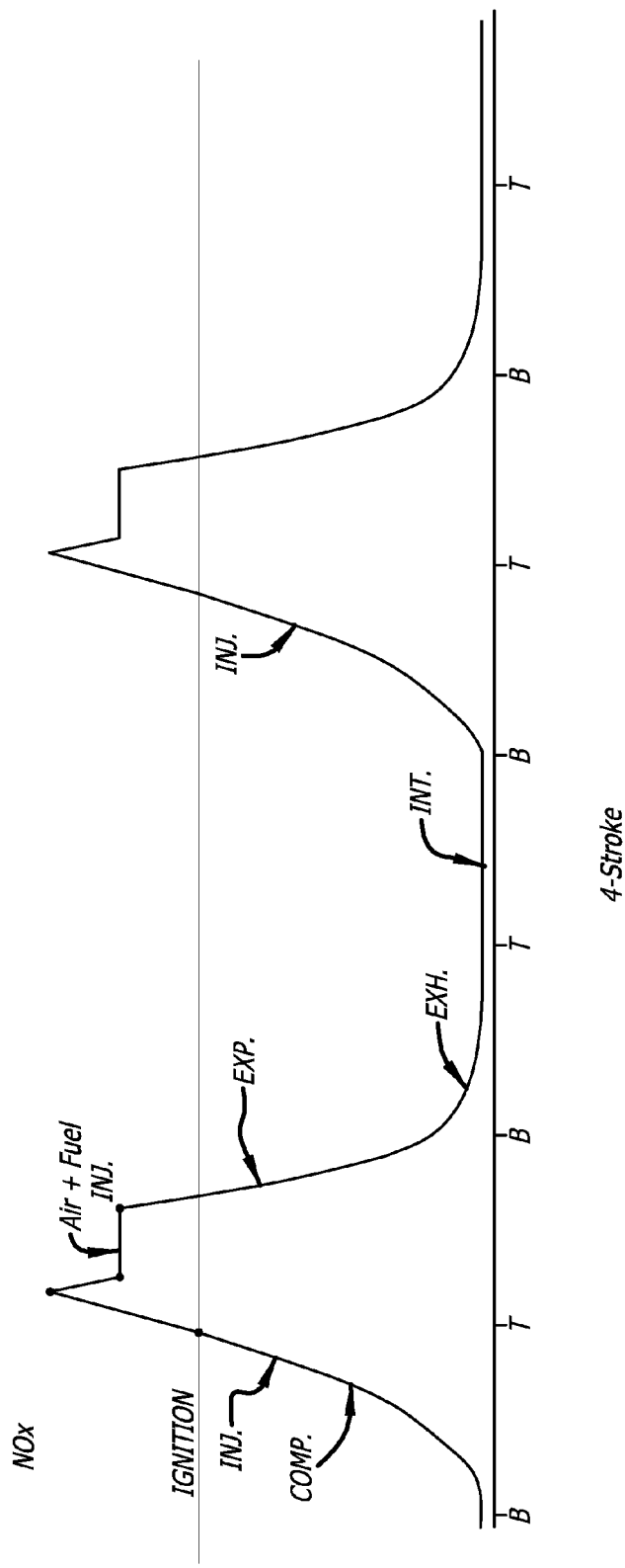
FIG. 1 illustrates the operation of a diesel engine in a four stroke mode in accordance with the present invention.

One convenient way of achieving this is by sensing pressure in the combustion chamber, as pressure provides a good indicator of temperature within the combustion chamber. In a preferred embodiment of the present invention, pre-injection is used during the compression stroke, preferably well before the air in the combustion chamber reaches the ignition temperature, to allow good mixing of the pre-injected fuel and the air prior to ignition. The amount of fuel used for pre-injection is controlled so that on ignition, combustion temperatures will rise to some level not exceeding the nitrous oxide temperature formation limit. This is illustrated, by way of example, in FIG. 1, which illustrates the operation of an engine operating on a four-stroke cycle. It will be noted from FIG. 1 that the ignition occurs substantially at the top dead center (T) of the piston. In a preferred embodiment, this is achieved not only by control of the amount of injection, but further by the use of a controllable engine valve actuation system, specifically, a hydraulic valve actuation system such as, by way of example, is disclosed in U.S. Pat. No. 6,739,293, the disclosure of which is incorporated herein by reference, by controlling such parameters as the crankshaft angle at which the intake valves close, thereby effectively controlling the compression ratio achieved and the crank angle at which ignition occurs. Further, in a preferred embodiment, a pressure sensor is used in the cylinder as previously indicated, which allows cycle-to-cycle adjustments in the control of the intake valve(s) and the amount of pre-injection to obtain ignition at the top dead center position T and to achieve the desired temperature increase thereafter to a temperature not exceeding the nitrous oxide formation temperature limit. As shown in FIG. 1, after the temperature in the combustion chambers peaks and starts decreasing as the pre-injection fuel is consumed and the piston moves away from the top dead center position, the temperature shown in FIG. 1, as well as the pressure in the combustion chamber, starts decreasing. While the temperature is still above the ignition temperature, main injection of the fuel may occur, together with air injection, preferably in the area of the tip of the fuel injection, during at least part of the main injection period. In that regard, while FIG. 1 indicates a temperature plateau during the air and fuel injection, the fuel injection may, in fact, comprise smaller multiple injection amounts, with the air injection being controlled in time, duration and amount as appropriate for best performance under the then operating engine conditions so that the plateau shown in FIG. 1 may well not be flat, but in general will be confined to well within a range between the ignition temperature and the nitrous oxide formation temperature limit.

It should be noted that while the preferred embodiments of the present invention utilize hydraulic engine valve actuation, other forms of controllable engine valve actuation should be equally applicable, such as magnetic, piezoelectric, etc. The present invention is also applicable to mechanical engine valve actuation systems, though it is believed the best performance may be obtained through better control of at least engine valve timing than practical with mechanical engine valve control.

Because of the injection of air as well as fuel during at least part of the main injection during the power stroke of the piston, greater amounts of fuel can be injected over a larger crankshaft angle without formation of nitrous oxide or excessive hydrocarbons in the exhaust, thereby providing a greater mechanical energy output for that power stroke. FIG. 1, of course, illustrates two complete cycles, showing the pre-injection INJ during a compression stroke, a schematic representation of the expansion or power stroke EXP, the exhaust stroke EXH and the subsequent intake stroke with its own pre-injection INJ event.

Having the ability to control engine valve operation allows one to vary the mode of operation of the engine. By way of example, referring to FIG. 2, a six-stroke mode of operation, which may be for the same engine as shown in FIG. 1, may be seen. Here, starting at the left of the Figure, a compression and pre-injection stroke begins, with the piston in the region of bottom dead center (B), with the power or expansion stroke EXPAN being substantially as that illustrated for the expansion stroke EXP in FIG. 1. However, at or near the bottom of the expansion stroke, an intake valve or valves for that cylinder are momentarily opened as a control of the pressures and temperatures to be achieved during a recompression RECOMP of the same combustion chamber charge. This control is used to control the re-ignition (RE-IGNITE) of the unburned hydrocarbon in the combustion chamber to occur at or near top dead center T. The amount of unburned hydrocarbons resulting from the first combustion stroke can be controlled by the amount of fuel injected primarily during main injection for that stroke, and of course, preferably is controlled so that the peak temperature achieved in the re-burn cycle also does not exceed the nitrous oxide formation temperature limit. However note that because of this re-burn cycle, greater levels of unburned hydrocarbons in the exhaust from the first burn cycle can easily be tolerated than if the exhaust from that first burn cycle were exhausted to the atmosphere. This may allow the injection of greater amounts of fuel and over a wider crankshaft angle during the main combustion cycle, thereby providing much greater mechanical energy output during that expansion cycle, while still achieving very low nitrous oxide and unburned hydrocarbon emissions.

Figure 2:
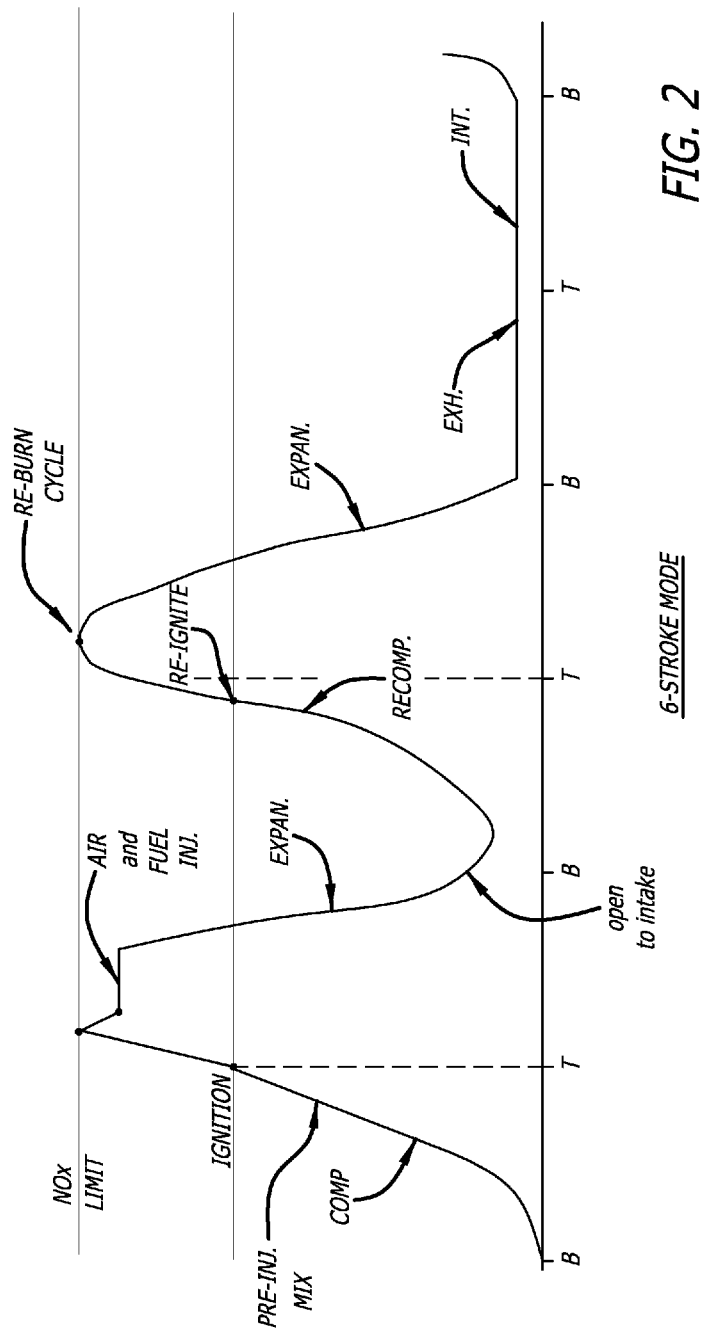
FIG. 2 illustrates the operation of a diesel engine in a six stroke mode in accordance with the present invention.

Note that the control of the ignition during the re-burn cycle in a preferred embodiment is done by momentarily having the intake valve or valves open to the intake, again adjustable cycle to cycle based on results of the previous cycle. Obviously an exhaust valve could be momentarily opened instead, though at the expense of higher emissions. The opening of an intake valve for this purpose can somewhat reduce the percentage oxygen content in the intake air, though not sufficiently to limit the combustion of the pre-injected fuel, and of course, oxygen rich air injected during the main injection of fuel can easily more than make up for any slight decrease in oxygen content in the rest of the combustion chamber. Finally, of course, as shown in FIG. 2, after the re-burn cycle, a conventional exhaust and intake event occurs over the next rotation of the crankshaft angle, and then the 6-stroke cycle repeats, unless the engine shifts to a different operating mode.

Figure 3:
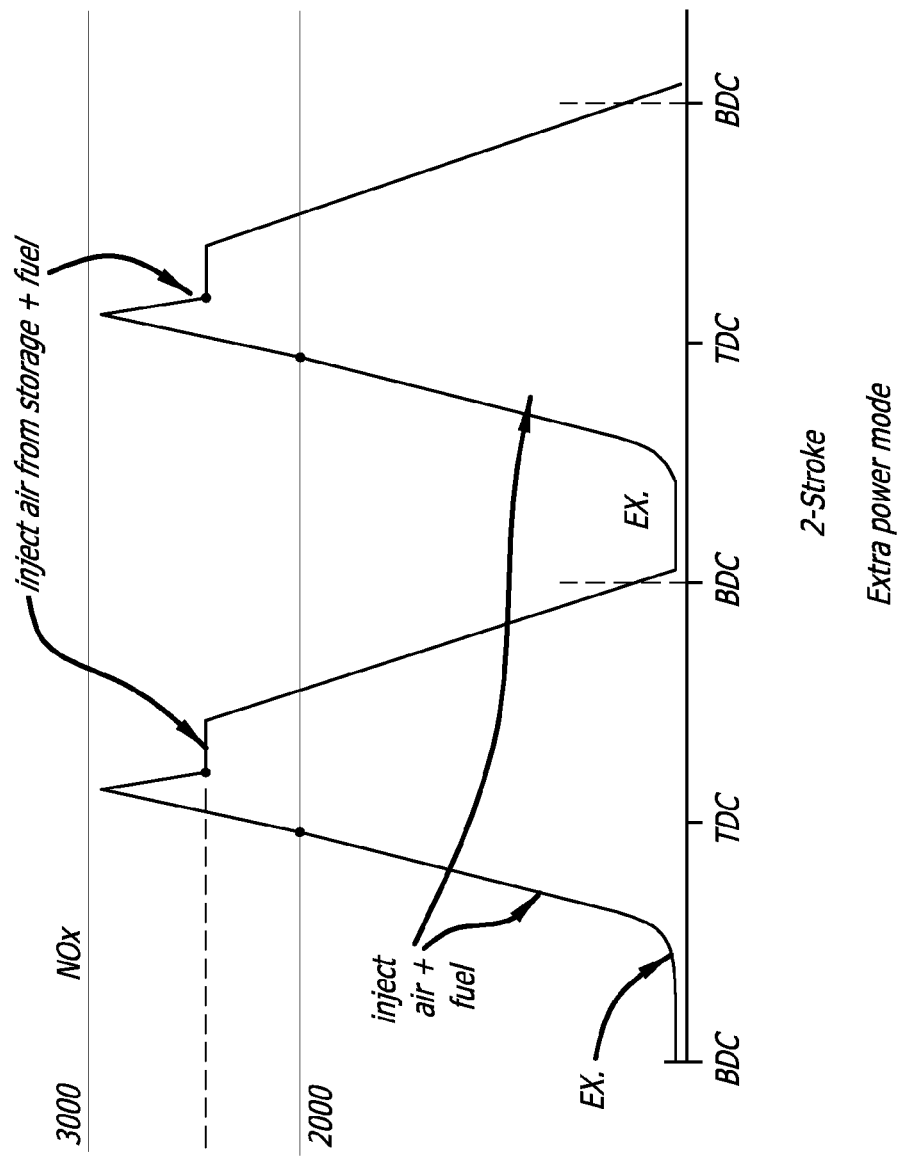
FIG. 3 illustrates the operation of a diesel engine in a two stroke mode in accordance with the present invention.

With control of the valve timing, the same engine may be operated in a two-stroke mode, as illustrated in FIG. 3. In general this would be a higher power mode because of the doubling of the number of power strokes over the four-stroke mode. In this mode, exhaust occurs when the piston is in the vicinity of bottom dead center BDC, with air being injected from a relatively lower pressure source, typically during the initial part of the compression stroke. Pre-injection of fuel would occur, as in the modes illustrated in FIGS. 1 and 2, with the amount of pre-injection and the amount of air provided for compression being selected to again achieve ignition at or near the piston top dead center TDC position and to limit the temperature rise on ignition of the pre-injected fuel to not exceed the nitrous oxide formation temperature limit. Again, as in the earlier modes of operation, fuel and air is injected during the main injection portion of the expansion stroke in a controlled manner to maintain a temperature between the ignition temperature and the nitrous oxide formation temperature limit while providing adequate oxygen to the injected fuel for a substantially complete combustion thereof. This cycle is repeated on each crankshaft rotation to obtain what otherwise is a substantially conventional two-cycle operation of the engine.

Figure 4:
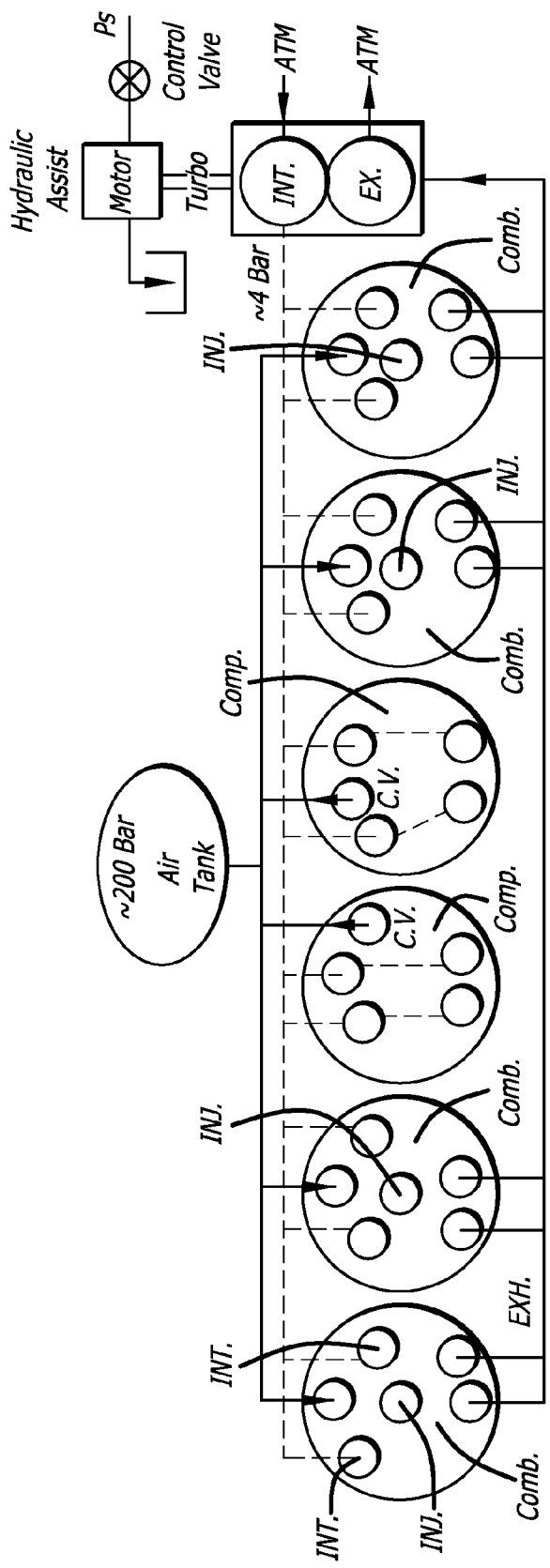
FIG. 4 is a schematic representation of a six cylinder engine incorporating an embodiment of the present invention.

Now referring to FIG. 4, a schematic of a possible general implementation of the present invention may be seen. In this implementation, a six-cylinder engine is shown, with the two center cylinders being used for compression COMP and the two cylinders at each end of the engine being used as combustion cylinders COMB. The exhaust EX from the combustion cylinder drives a turbocharger TURBO prior to being exhausted to the atmosphere ATM. The turbocharger in this embodiment would increase the intake air INT to a pressure of approximately 4 bar, providing the turbocharged air to the intake valves on all six cylinders. For purposes of engine starting, and whenever else a turbocharger boost is required or beneficial, a hydraulic assist may be provided through a hydraulic motor controlled by a control valve coupled to a source of hydraulic fluid under pressure $P_S$. In the case of the two compression cylinders COMP, what normally might be two intake valves and two exhaust valves for each cylinder may be all used as input valves, with a check valve C.V. in each of the compression cylinders COMP for exhausting compressed air from the compression cylinder COMP to an air tank at a pressure of approximately 200 bar. This pressure, of course, may be controlled by controlling the crankshaft angle at which the intake valves of the compression cylinders COMP are closed, which of course also controls the volume of high pressure air delivered to the air tank. In that regard, note that the compression cylinders COMP always operate in a two-cycle compression mode, whether the combustion cylinders COMP may themselves operate in a two-cycle, four-cycle, six-cycle, or some other mode. The air from the air tank is injected into each of the combustion chambers COMB through a valve which, in the preferred embodiment, is also hydraulically controlled through an electronic controller, and of course timed and sized, etc., to provide the desired amount and timing of the air injected into the combustion chamber. In that regard, obviously the pressure in the air tank must be higher than the pressure in the combustion chamber at the time of injection of the air, though in the preferred embodiment that is easily achieved by actually monitoring the pressure in the combustion chamber, both as the pressure and as an indication of the temperature in the combustion chamber. Note that while a single valve is schematically illustrated in FIG. 4 for injection of air from the air tank, multiple valves may be used. Preferably the pressure in the air tank will be controlled by control of the intake valves on the compression cylinders COMP to provide a higher pressure than is in the combustion chamber COMB during air injection, but not so much higher as to dissipate unnecessary energy. In that regard, the highest pressure obtainable in the air tank may readily be set by design by choice of the compression ratio for the compression cylinders COMP, which by the engine head design may be different from and particularly larger than the compression ratio for the combustion cylinder COMB. The actual pressure in the air tank, as well as the volume of air delivered to the air tank, is readily controllable by control of the intake valves to the compression cylinders.

Note that in general, the air in the air tank will be hot because of its substantially adiabatic compression, though in general not much of that energy will be lost, as normally the high pressure air will used for injection before that heat is lost. Alternatively, of course, the air tank may be substantially larger and provide a significant reservoir of high-pressure air to provide a substantial boost in engine power and output for at least a short duration of time. As a further alternative, the air tank might be comprised of a relatively small primary air tank and a substantially larger secondary air tank, the secondary air tank being filled with high-pressure air at times such as during the use of the engine for braking purposes, resulting in additional improvement in fuel consumption, and consequently, reduced $CO_2$ emissions.

Figure 5:
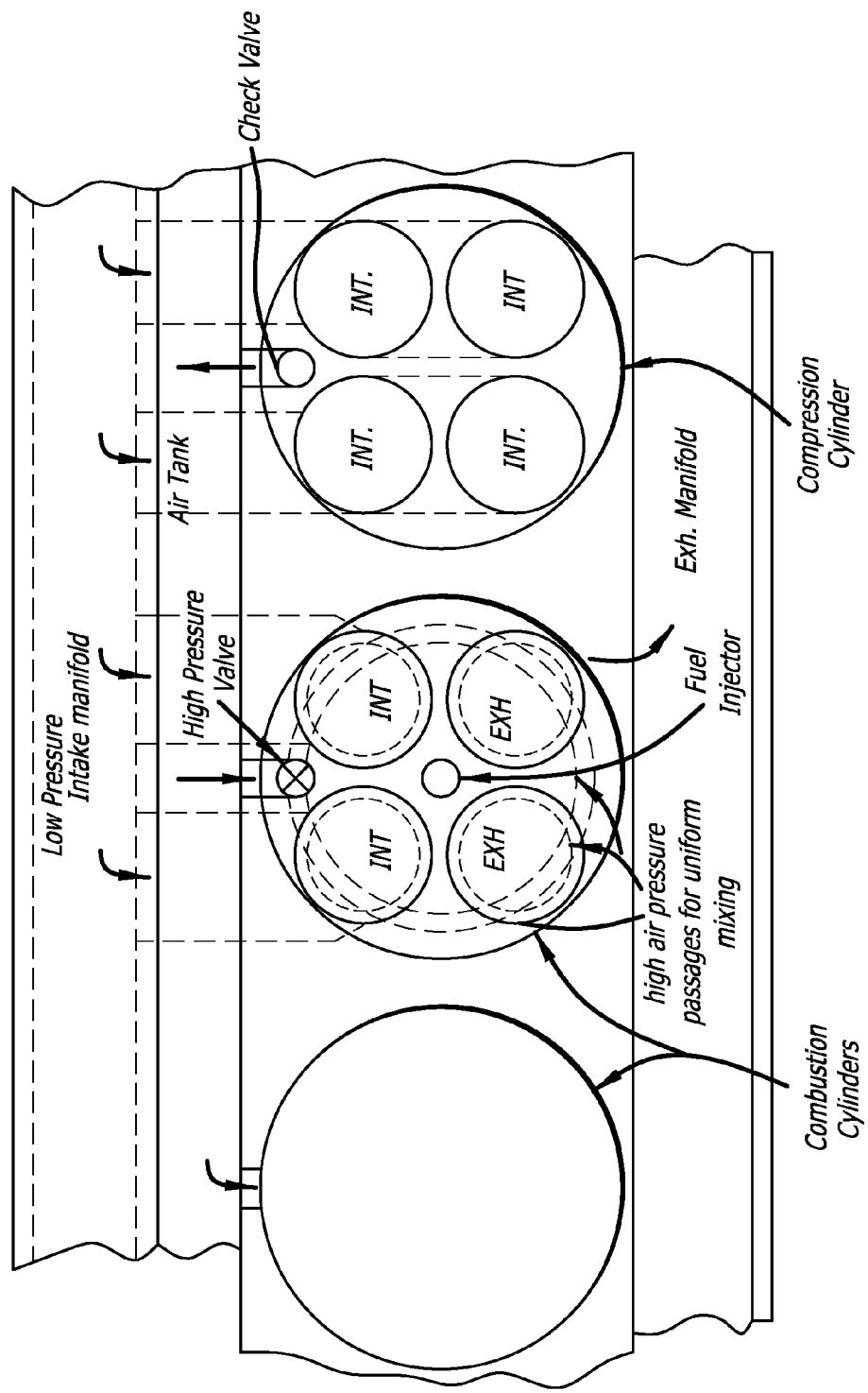
FIG. 5 is a schematic representation of an engine head incorporating the present invention.
Figure 6:
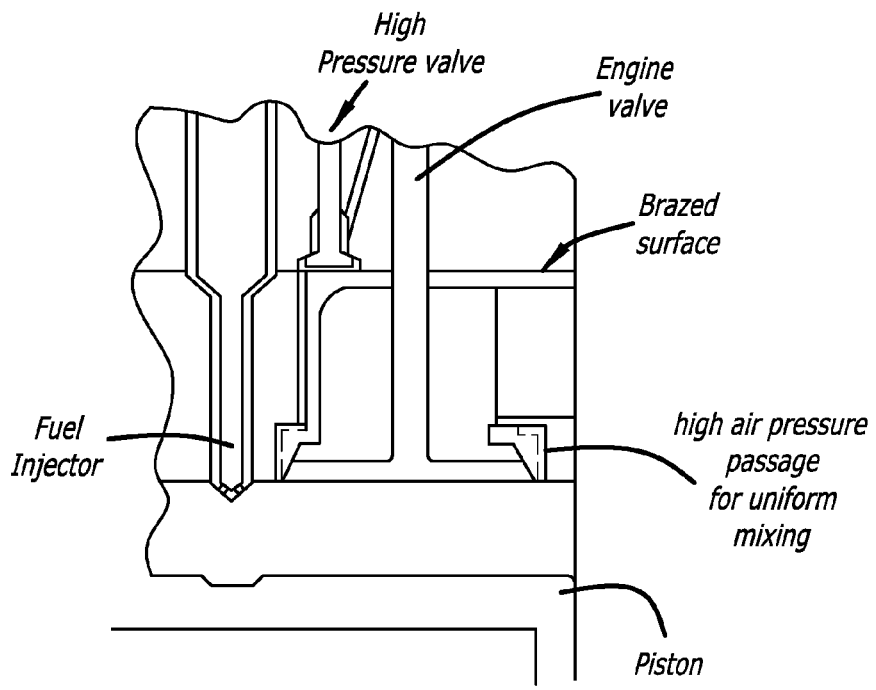
FIG. 6 is a partial cross section of a part of an engine head incorporating the present invention.

Now referring to FIGS. 5 and 6, a schematic illustration looking at a portion of the head of an engine incorporating the present invention and a schematic cross-section taken through a part of the head may be seen. As shown in FIG. 5, the cylinder at the right side of the Figure is a compression cylinder, wherein all four valves are used as intake INT valves, with the check valve being much smaller because of the much higher pressure and much lower volume of the high pressure outlet air in comparison to the low pressure intake air. The cylinder in the center of the Figures illustrates two intake valves INT and two exhaust valves EXH, with a fuel injector at the center thereof. Above the fuel injector is shown a valve that controls inlet of the high pressure air from the air tank to the high air pressure passages for uniform mixing. These passages are also illustrated in FIG. 6, wherein the high pressure valve controls the injection of the high pressure air from the air tank, in this embodiment to regions around the engine valves. Obviously while FIGS. 5 and 6 illustrate an exemplary manifolding for distribution of the air injected into the combustion chamber during the expansion stroke, such manifolding may take many forms, perhaps by way of example, by injecting air around the periphery of the fuel injector, by angling the orifices through which the air is injected, all in the same or in different directions, etc.

The present invention has been described herein in relation to diesel engines, though is applicable to other types of engines such as gasoline engines and alternative fuel engines, such as bio-diesel engines and the like. In the case of gasoline engines, carburetion or pre-injection may be used to provide a spark-ignitable mixture at or near top dead center, with additional fuel and air being injected during part of the power stroke, as in diesel engines. Alternatively, pure compression ignition could be used regardless of the fuel used, using a sufficiently lean mixture resulting from the pre-injection to limit the highest temperature obtained to a temperature not exceeding the nitrous oxide formation temperature limit or to cause pinging, and yet to substantially immediately ignite the additional fuel injected into the combustion chamber in conjunction with the injected air during main injection. Also as a further alternative, spark ignition might be used for starting of a gasoline engine, using either a normal cycle or the cycle of the present invention, and then shifting to compression ignition after starting and/or after some degree of warm-up of the engine.

It should be noted that when using gasoline in the compression ignition mode, the engine control will automatically adjust to obtain ignition at or near top dead center, independent of the octane rating of the gasoline used.

In an exemplary embodiment, one cylinder of an engine is used for air compression purposes and another cylinder of the engine is used as the combustion or power cylinder. In a 6 or 8 cylinder engine, for instance, one half the cylinders may be used as compression cylinders and the other half as combustion or power cylinders, though this one-to-one proportion is exemplary only and not a limitation of the invention.

Referring now specifically to FIG. 7, a schematic illustration of two cylinders of a multi-cylinder engine in accordance with an embodiment of the present invention may be seen. This Figure illustrates schematically the exemplary valving for two cylinders of the engine, the right cylinder 20 in this Figure being used for compression and the left cylinder 22 being used as a combustion or power cylinder. It is assumed that the engine includes electronically controllable valves such as intake and exhaust valves, and electronically controllable fuel injectors, so that valve timing and injection timing are electronically controllable through an appropriate electronic control system. One appropriate engine valve control system is an electronically controllable hydraulic engine valve control system such as that disclosed in U.S. Pat. No. 6,739,293, the disclosure of which is (already) incorporated herein by reference. An example of an appropriate fuel injector may be of the general type disclosed in U.S. Pat. No. 5,460,329, the disclosure of which is also incorporated herein by reference.

As shown in FIG. 7, an intake manifold INTAKE is coupled to three intake valves IN in the compression cylinder 20 and to a single intake valve IN in the combustion cylinder 22 at the left-hand side of the Figure. While the intake manifold may be at a somewhat elevated pressure, such as by way of example, through a supercharger, in a preferred embodiment the pressure in the intake manifold INTAKE will simply be atmospheric pressure, or only slightly thereabove due to the dynamic pressure from the motion of the vehicle in which the engine is mounted. Similarly, the exhaust manifold EX in a preferred embodiment will be as close to atmospheric pressure as reasonably possible, though while not preferred, an exhaust powered supercharger might be used with the present invention.

In addition to the intake manifold INTAKE and the exhaust manifold EX, a low pressure air rail $AR_L$ and a high pressure air rail $AR_H$ are provided. The low pressure air rail $AR_L$ is preferably coupled to a storage tank 24 having a substantial storage capacity. The high pressure air rail $AR_H$, in a preferred embodiment, has its own internal volume, though does not have a separate storage tank coupled thereto. Alternatively, however, a high pressure air storage tank may be used, with or without a controllable valve thereon to couple the same to the high pressure air rail $AR_H$.

During the intake stroke for the compression cylinder 20, the intake valves IN are generally open, after which during the compression stroke, the compressed air is exhausted, either by opening the valve $AR_L$ to couple the compressed air to the low pressure air rail $AR_L$ and its associated storage tank 24, or to exhaust the compressed air through the high pressure air exhaust valve $AR_H$ to the high pressure air rail $AR_H$. For most efficient operation, the opening of the exhaust valve to the low pressure rail $AR_L$ or the opening of the high pressure exhaust valve $AR_H$ to the high pressure rail $AR_H$ is coordinated with the pressure in the compression cylinder 20 by monitoring the pressure in the compression cylinder 20 through a pressure sensor 26. In that regard, not shown are pressure sensors sensing the pressure in the low pressure air rail $AR_L$ and the high pressure air rail $AR_H$, partially for purposes of overall engine control, and in addition, for the appropriate timing of the opening of either of the exhaust valves in the compression cylinder 20 so that significant energy is not lost by large pressure differentials between the compression cylinder 20 and the rail to which the respective exhaust valve is opened, whether a positive or negative pressure differential. In that regard, note also that the amount of air compressed, while having some maximum volume due to the size of the compression cylinder 20, typically but not necessarily of the same diameter as the power cylinder 22, may be reduced by closing the intake valves substantially before the piston reaches bottom dead center during the intake stroke, or alternatively, substantially after the piston passes its bottom dead center position, so that the amount of air trapped in the compression cylinder 20 for compression is thereby reduced. By not opening the intake valves IN during the intake stroke and/or not opening either of the exhaust valves to either of the two pressurized air rails, the amount of pressurized air delivered to either air rail may be reduced to zero. Also note that the compression ratio of the compression cylinder 20 may be the same as, or different from that of the combustion cylinder, and more particularly may be higher than the compression cylinder if desired.

Thus through control of the intake valve IN and the exhaust valves $AR_L$ and $AR_H$ of the compression cylinder 20 and the use of air from these air pressure rails, the pressure in the low pressure air rail $AR_L$ and its associated storage tank 24 and in the high pressure air rail $AR_H$ may be readily controllable. In a preferred embodiment, the pressure in the low pressure air rail $AR_L$ may normally be approximately 15 bar, perhaps with a low of approximately 10 bar and a high of approximately 20 bar. The pressure in the high pressure air rail $AR_H$, on the other hand, is preferably substantially higher, in one embodiment ranging from approximately 140 bar to approximately 200 bar.

The combustion cylinder 22 includes an intake valve IN coupled to the intake manifold INTAKE and two exhaust valves EX coupled to the exhaust manifold EX. The combustion cylinder further includes a fuel injector INJ, typically approximately centered with respect to the combustion cylinder. Accordingly, the combustion cylinder 22 may be operated as a conventional 4-stroke compression ignition engine having an intake, a compression, a combustion and an exhaust stroke. However in accordance with an aspect of the present invention, operation of the engine may be enhanced even in a conventional 4-stroke mode by injecting not only fuel for combustion, but at the same time, injecting air from the high pressure air rail $AR_H$, in the embodiment shown either through a small high pressure air injection valve $AR_{H2}$, through a larger high pressure air injection valve $AR_{H1}$, or through both such valves. As shall be subsequently shown in greater detail, this high pressure air, when injected, is preferably injected around the tip of the fuel injector INJ itself, which air injection has a number of advantages. First, the injection of high pressure air creates turbulence in the immediate vicinity of the fuel spray from the fuel injector, providing much better mixing and avoiding local hot spots which can generate $NO_X$. Also, a typical fuel injector injects fuel into the combustion chamber with a substantial radial component to avoid, or at least minimize, impingement of the injected fuel on the piston, which can damage the piston as well as cause high emissions because of incomplete combustion caused thereby. As a result, however, as the piston moves away from top dead center, so does the air in which combustion is desired, so that continued injection tends to be concentrated in what now is the upper part of the combustion chamber volume, thereby not taking advantage of more oxygen rich air therebelow. By injecting the high pressure air as described, the air around the injector tip, which otherwise may become oxygen depleted, is instead replenished with oxygen-rich air, allowing more complete combustion even during a longer injection event than in the prior art. In that regard, in the preferred embodiment a pressure sensor 28 is also used in the combustion chamber, the pressure sensor 28 sensing not only pressure but effectively indirectly sensing combustion chamber temperature. Accordingly, the fuel injector INJ may be controlled to control/limit fuel injection rates to limit the combustion chamber pressure, and thus the combustion chamber temperature, to temperatures below which $NO_X$ will form. In that regard, note that because of the injection of high pressure air during fuel injection, a fuel injection event may occupy a larger crankshaft angle span than in the prior art because of the replenishment of oxygen-rich air in the vicinity of the injected fuel, even after the piston has moved substantially downward from its top dead center position. Of course, one may use pilot injection, together with main injection, which in itself may be a continuous or a pulse injection, as desired to limit the combustion chamber temperature to below that at which $NO_X$ forms and in accordance with the capabilities of the injection system. Similarly, the injection of high pressure air may or may not be used during any pre-injection and may or may not exactly coincide with the main injection of fuel, as desired and as may be intentionally varied with engine operating conditions.

Figure 8:
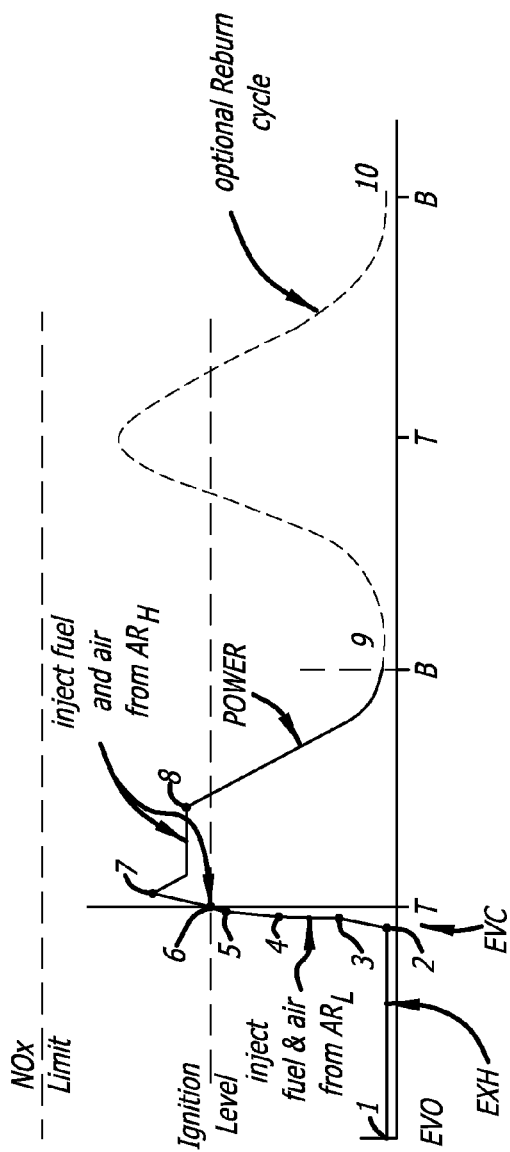
FIG. 8 illustrates the operation of the engine in a 2-stroke manner by way of a graph of temperature versus piston position, with various points on the graph labeled in accordance with various events during the operation of the engine.

Now referring to FIG. 8, another aspect of the present invention may be seen. In accordance with this aspect, an engine in accordance with the present invention, such as that illustrated with respect to FIG. 7, may be operated as a 2-stroke engine, thereby providing as many power strokes for the same engine RPM as would be obtained if both cylinders of FIG. 7 were operated in a conventional 4-stroke cycle. FIG. 8 illustrates the operation of the engine in a 2-stroke manner by way of a graph of temperature versus piston position, with various points on the graph labeled in accordance with various events during the operation of the engine. The graph illustrates the conditions from bottom dead center B of the piston in the combustion cylinder 22 to top dead center T and back to bottom dead center D, after which the cycle illustrated is repeated, or alternatively, particularly in low power output situations, an optional reburn cycle may occur during the next piston travel from bottom dead center B to top dead center T and back to bottom dead center B, as illustrated toward the right of the graph of FIG. 8. Starting at the left of the graph of FIG. 8 at bottom dead center B, the exhaust valve is opened (EVO) throughout most of the piston travel toward its top dead center position T. Then at an appropriate crankshaft angle, as may be determined from by the control system based on engine operating conditions and environmental conditions, and adjusted cycle to cycle based in part on the actual operation during the prior cycle, at point 2 the exhaust valve is closed (EVC) and at that point, or shortly thereafter, air from the low pressure air rail $AR_L$ is coupled to the valve $AR_L$ (FIG. 7) to the combustion cylinder and a small pilot injection of fuel occurs (point 3), with the pilot injection and the air injection being terminated at point 4. Then, at some point just before or just after the ignition temperature is reached, more fuel and high pressure air may be injected into the combustion chamber and then terminated, though after the highest temperature (pressure) point 7 has been reached and the same start to drop as the piston moves downward, further high pressure air and fuel may be injected to maintain combustion, and thus, combustion chamber temperature and pressure throughout a substantial crankshaft angle, all at a temperature below the temperature at which $NO_X$ forms, after which at point 8, fuel and air injection are stopped throughout the remainder of the power stroke, with either the exhaust valve being opened near bottom dead center (point 9) to repeat the cycle just described, or in low power operations, to execute a reburn cycle for the combustion chamber charge by leaving all valves in the combustion chamber closed, or alternatively, by controlling one or more of the exhaust valves EX, the intake valves IN and/or the valve to one of the air rails to control the pressure and volume and thus the temperature of the reburn charge so that ignition for the reburn occurs at or near top dead center.

The above explanation of the operation of the engine of the present invention for a 2-stroke is of course exemplary only, as pilot injection may occur without high pressure air injection or may, in fact, not be used at all. Similarly, pilot injection may occur somewhat later in the compression stroke with main injection and high pressure air injection occurring after ignition of the pilot injection, though in a manner controlled (pulsed or otherwise) to limit the upper temperature in the combustion chamber to below that at which $NO_X$ will form, though to maintain a substantial pressure and temperature in the combustion chamber throughout a substantial crankshaft angle for a highly effective power stroke.

Figure 9:
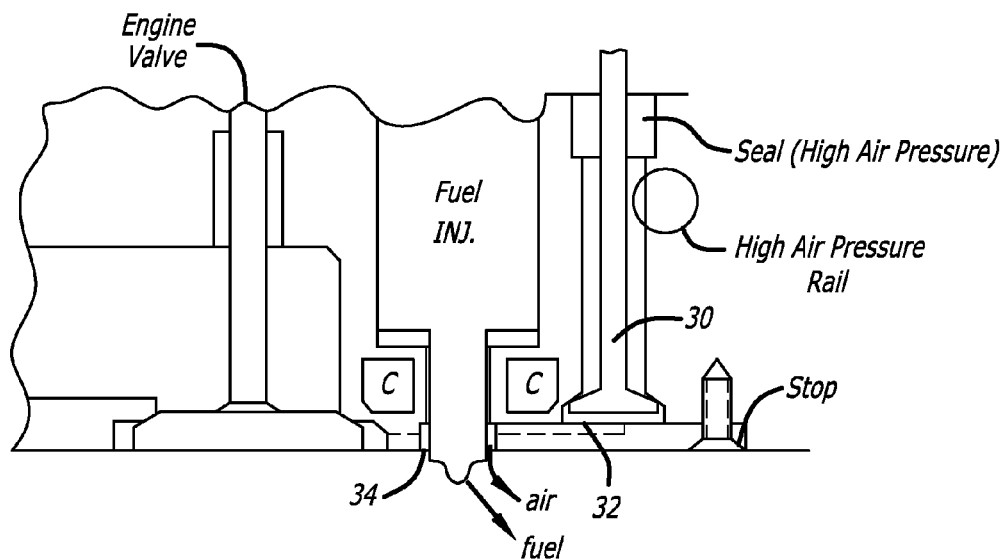
FIG. 9 is a schematic cross-section of a cylinder head in the region of combustion cylinder of FIG. 7).

Now referring to FIG. 9, a cross-section of a cylinder head in the region of combustion cylinder 22 (FIG. 7) may be seen. Shown in that Figure is an engine valve, such as one of the exhaust valves EX or the intake valve IN of FIG. 7. Not shown is the intake valve $AR_L$, coupled to the low pressure air rail $AR_L$, again shown in FIG. 7, though that valve may be a conventional poppet valve such as the engine valve shown in FIG. 9, though typically substantially smaller because of the still substantially elevated pressure and density of the air in the lower pressure air rail in comparison to atmospheric pressure. Shown in FIG. 9, however, is a still further typically smaller poppet valve 30, which when opened couples the high pressure air rail $AR_H$ to a manifold region 32, which in turn distributes the high pressure air circumferentially around the tip of the fuel injector fuel INJ by exhausting the high pressure air through annular region 34. In a typical application the air in the high pressure air rail will be injected into the combustion cylinder at a controlled pressure above the pressure in the combustion cylinder to create a substantial air flow through the spray emitted by the fuel injector during injection, though at not such a high pressure differential as to dissipate substantial energy. Thus the injection of air in this manner avoids hot spots in the combustion chamber, provides much better mixing of the injected fuel and air and replenishes oxygen-rich air as it is consumed by the combustion process in the part of the cylinder into which the fuel is injected to potentially allow more fuel to be injected and burned to potentially provide increased power output on each power stroke.

Figure 10:
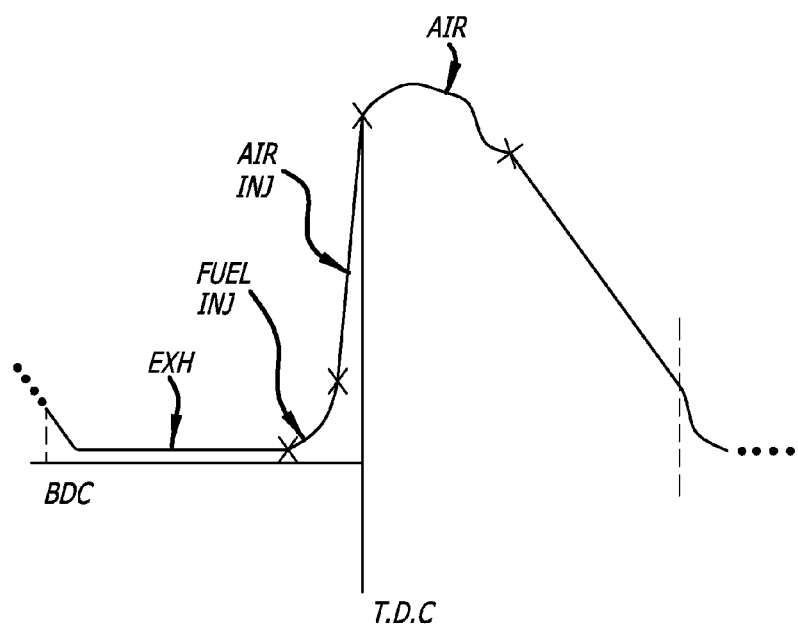
FIG. 10 illustrates another mode of operation of engines in accordance with the present invention.

Another mode of operation of engines in accordance with the present invention may be seen in FIG. 10. This mode is illustrated with respect to two cycle operation of the engine, though as with the prior modes of operation, can readily be extended to four or more cycle operation, as desired or as selected based on engine operating conditions. The concept of this mode of operation is that at or about the bottom dead center BDC of the piston after a power stroke the exhaust EXH valve or valves are opened for most of the piston travel toward the top dead center TDC position of the piston, after which the exhaust valve or valves are closed. Then early in the compression thereafter, fuel injection occurs, continuing until full fuel injection has occurred. Toward the end of fuel injection, or after fuel injection has been completed, the injection of high pressure air from the high pressure air rail $AR_H$ begins around or just before the piston reaches the top dead center TDC position, with ignition occurring near the top dead center TDC position and continuing as the high pressure air continues to be injected, until some substantial crankshaft angle past the top dead center position is reached. Upon completion of combustion thereafter, normal expansion occurs until at or near the bottom dead center BDC position of the piston, at which time the exhaust valve opens to repeat the cycle just described. Alternatively, the initial injection of air may be from the low pressure air rail $AR_L$, followed by injection of air from the high pressure rail $AR_H$, these pressures being controllable by valve timing to provide the most efficient injection pressures.

The advantage of this latter mode of operation is as follows. Because injection of the fuel occurs into the hot exhaust gasses from the prior power stroke before combustion is initiated, the injected fuel will be vaporized (turned into the gaseous state) by the hot exhaust gasses to provide a very fuel rich environment in comparison to the limited oxygen in the exhaust gasses. Consequently, compression ignition of this mixture would be limited in temperature by the limited oxygen available, and of course, automatically held well below the temperature at which $NO_X$ may be formed. The high pressure air injection beginning typically, though not necessarily, before compression ignition, will increase the combustion, and thus, temperatures after compression ignition, though the timing and amount of air injection may be controlled to still limit the combustion temperatures to below the temperatures at which $NO_X$ will form. In that regard, note that as high pressure injection continues, combustion will continue until the fuel is consumed, though with a controlled fuel-air mixture to avoid local hot spots that would otherwise cause the formation of $NO_X$. In comparison, in a conventional diesel engine, droplets of fuel are sprayed into oxygen rich air, giving rise to local hot spots and the generation of $NO_X$, whereas in this mode of operation, fuel droplets are vaporized (turned into a gaseous state) and the vapor thoroughly mixed with the residual exhaust gas, and typically with the initial injection of high pressure air, so the fuel-air ratios during combustion throughout the combustion chamber may be and are limited to those below which will yield temperatures creating $NO_X$. Obviously, the timing and amount of the fuel injection, as well as the timing and amount of high pressure air injection, may be varied with engine operating conditions and environmental conditions to maintain the required power while appropriately adjusting to provide minimum emissions. Again, as before, operating in the two cycle mode will increase the power output of the combustion cylinder to make up for the use of another cylinder for pressurizing the high pressure rail $AR_H$. Further, the high pressure air may be injected into the combustion cylinder in a manner to encourage mixing and to scavenge the cylinder walls of unburned fuel vapors and air to encourage complete combustion.

Referring again to FIG. 10, the timing and amount of the fuel injection, as well as the timing and amount of high pressure air injection in this mode of operation of the engine may be generally as follows. The amount of fuel injection will be dependent on engine load demands, though the timing may be fixed in terms of crankshaft angle, or varied somewhat dependent on the time of closure of the exhaust valve or valves. Still, preferably the full amount of fuel to be injected is injected just as or soon after the exhaust valve or valves are closed to be sure that the hot exhaust gases have time to turn the injected fuel into the gaseous state during compression. Then during compression, some air is injected, a sort of pre-injection, to provide enough oxygen in the combustion chamber to allow ignition to occur at or near top dead center of the piston, but not enough to allow the temperature in the combustion chamber to reach $NO_X$ formation temperatures. The time of combustion in terms of crankshaft angle may be controlled by control of the various parameters, and adjusted, cycle to cycle. Then when pressure in the combustion chamber has decreased and combustion progresses to the point where combustion is about to stop, more air is injected, continuing until all fuel in the combustion chamber is burned.

This has at least three advantages. First, by coordinating the air injection during compression with the air injection during combustion, the combustion chamber pressures during these two air injections may be made substantially equal, thereby allowing efficient air injection during both injections using the same pressurized air supply. This avoids the need for two different pressure air supplies. Secondly, by injecting the air before top dead center, and then after top dead center, air injection at the maximum combustion chamber pressures is avoided. Third, injecting the air after the pressure in the combustion chamber has decreased means that the air is injected after the piston has substantially passed top dead center, providing a better crank angle for more efficient delivery of mechanical work to the crankshaft for more efficient energy transfer. The air injected may be from one or more cylinders of a multi-cylinder engine, or from a separate air compressor, either with or without an intercooler.

It should be noted that engines in accordance with the present invention may be operated in a sort of blend of the operating modes described herein. By way of example, while most of the fuel injection may occur prior to compression ignition as just described, some additional fuel injection may occur during the power stroke, if desired. In that regard, it should noted that because of the ability to control the timing of the intake and exhaust valves in the compression cylinder and the exhaust valves, air injection valves and fuel injector in the combustion cylinder, the timing of air injection and fuel injection and the amount of air and fuel injection, whether through a single injection event or multiple injection events, are fully controllable and variable as desired, typically in response to engine operating conditions and environmental conditions. The inclusion of an intake valve or intake valves in the combustion cylinder as shown in FIG. 7 allows further flexibility in the possible operating modes of the engine as hereinbefore described. Of course the pressure sensor 28 shown in FIG. 7 allows cycle-to-cycle optimization of the operation of the engine based on any deviations from the optimum operation during the prior cycle.

Figure 11:
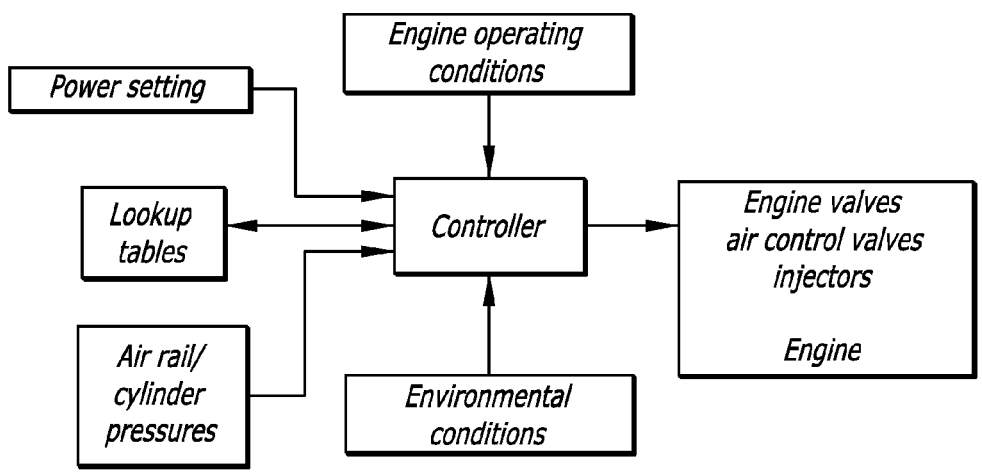
FIG. 11 illustrates a control system that may be used with embodiments of the present invention.

The present invention has been disclosed herein with respect to the injection of a fuel for compression ignition, which in a preferred embodiment is diesel fuel, though other petroleum based or non-petroleum based fuels may be used as desired. Further, with appropriate alteration as will be obvious to those skilled in the art, gaseous fuel and gaseous fuel stored in a liquid form may also be used, such as liquid natural gas, propane, butane and hydrogen, to name a few examples. Any of these fuels or mixtures of any of these fuels may be used alone or in combination with small amounts of one or more suitable additives for such purposes as, by way of example, initiating compression ignition at a desired combustion chamber temperature. Also the engine of the present invention for diesel fuel, as well as any of these other fuels, may readily be controlled by control systems such as that shown in FIG. 11. As shown in that Figure, the engine valves, air control valves and injectors in the engine may be controlled by a controller, typically a microprocessor based controller under program control stored in read-only memory in the controller and responsive to the power setting based on engine operating conditions, environmental conditions and cylinder and air rail pressures to determine the nominal parameters for operation of the engine valves, air control valves and injectors as may be based on predetermined information stored in the look-up tables. Such a controller in the system of the present invention would typically be responsive to the pressure sensors in the compression cylinder 20, the combustion cylinder 22 and the low and high pressure air rails $AR_L$ and $AR_H$ to coordinate the operation of the system for optimum performance, typically with operation during a particular cycle of operation of the engine being adjusted based on the operation during the prior cycle to essentially form one or more closed loops to be sure ignition occurs at the proper crankshaft angle, that combustion chamber temperature limits are not exceeded, etc. Also of course other operating modes may be readily incorporated, such as compression braking, storage of additional high pressure air while using engine or compression braking or simply at low power settings, operation in higher stroke modes, such as six cycle and eight cycle, skip cycle operation, etc. In that regard, for bursts of extra power, the engine may be operated with high pressure air injection based on previously stored high pressure air, eliminating for a time the power consumption required to provide the high pressure air for injection while at the same time enjoying the extra power obtained by the high pressure air injection. This has advantages over other energy storage techniques such as battery storage, as one does not have to convert to electrical energy and back again with its attendant losses and complexity. It even has advantages over storage of high pressure air from some other compressor and conversion back to mechanical energy be some form of turbine or other pneumatic motor, mainly by avoiding the need for these extra components. The present invention also has a great advantage in improving combustion and avoiding the generation of $NO_X$, which is far more practical and far less expensive than trying to remove $NO_X$ as an emission once it is formed.

Figure 12:
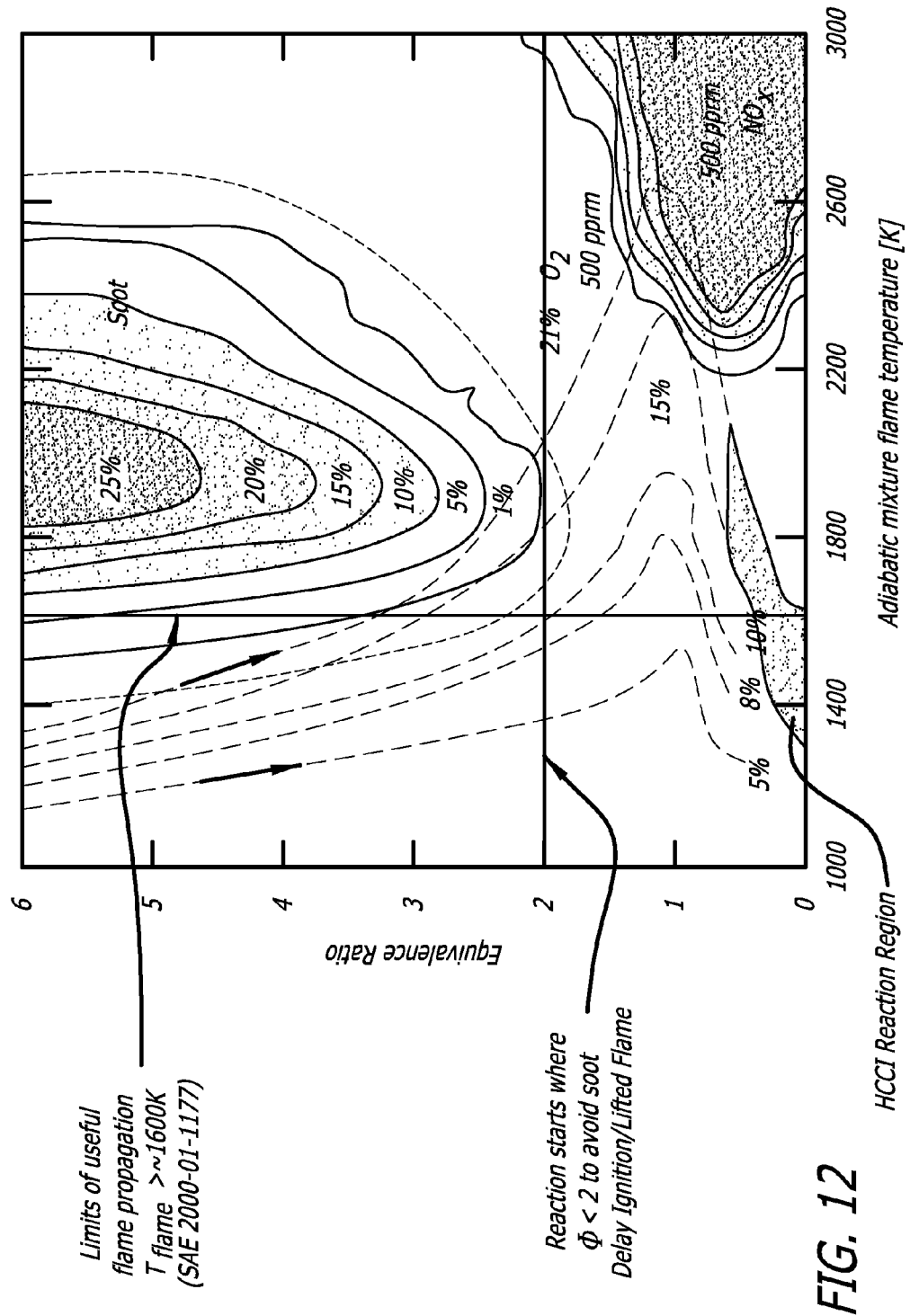
FIG. 12 is a graph showing conditions under which soot and $NO_X$ are created in an engine.

Now referring to FIG. 12, a graph showing conditions under which soot and $NO_X$ are created may be seen. This graph is useful in helping to illustrate various concepts and features of the present invention. The X axis is temperature in degrees Kelvin and the Y axis is equivalence ratio. Equivalence ratio is a ratio of fuel to oxidizer divided by the stoichiometric ratio of fuel to oxidizer. Thus an equivalence ratio of two, as highlighted in the graph, represents twice as much fuel as the oxygen present will be able to burn. Typically in a prior art diesel engine, the equivalence ratio on a macro scale would be less then one, that is, the total amount of fuel injected for the total amount of oxygen in the cylinder will normally be less than the stoichiometric ratio. However, various real world conditions in the cylinder result in local fuel-air ratios being way above the stoichiometric ratio, which can cause relatively high local equivalence ratios giving rise to soot, as may be seen in the graph. Such conditions include the fact that in the prior art, fuel is injected into the cylinder through fixed spray nozzles, giving high concentration of fuel in very localized regions of the combustion chamber. This condition, of course, only gets worse as nozzles become partially clogged, etc. Also as previously mentioned, fuel injection begins at or near top dead center of piston motion in the prior art, resulting in the need for a substantially radial injection direction, though the center of the volume within the combustion chamber moves downward as injection proceeds, moving a significant part of the oxygen in the combustion chamber downward away from the continued fuel injection.

Referring to FIG. 12 again, the lines encircling the upper black area give the percentage of soot that will be formed, whereas the lines around the lower right give the amount of $NO_X$ that will be formed in parts per million. The curved lines starting from the upper left represent the percentage of oxygen in the combustion chamber, ranging from 21% oxygen for the right hand curve to 5% oxygen for the left hand curve. It may be seen that provided the upper temperature in the combustion chamber, even locally, is controlled and the equivalence ratio even locally is controlled, substantially no soot nor $NO_X$ will be generated. Obviously if one has an equivalence ratio of two throughout the entire combustion chamber and a relatively low percentage of oxygen, neither soot nor $NO_X$ will be generated, but the exhaust would contain consider amounts of unburned hydrocarbons (fuel), also not satisfactory.

Figure 13:
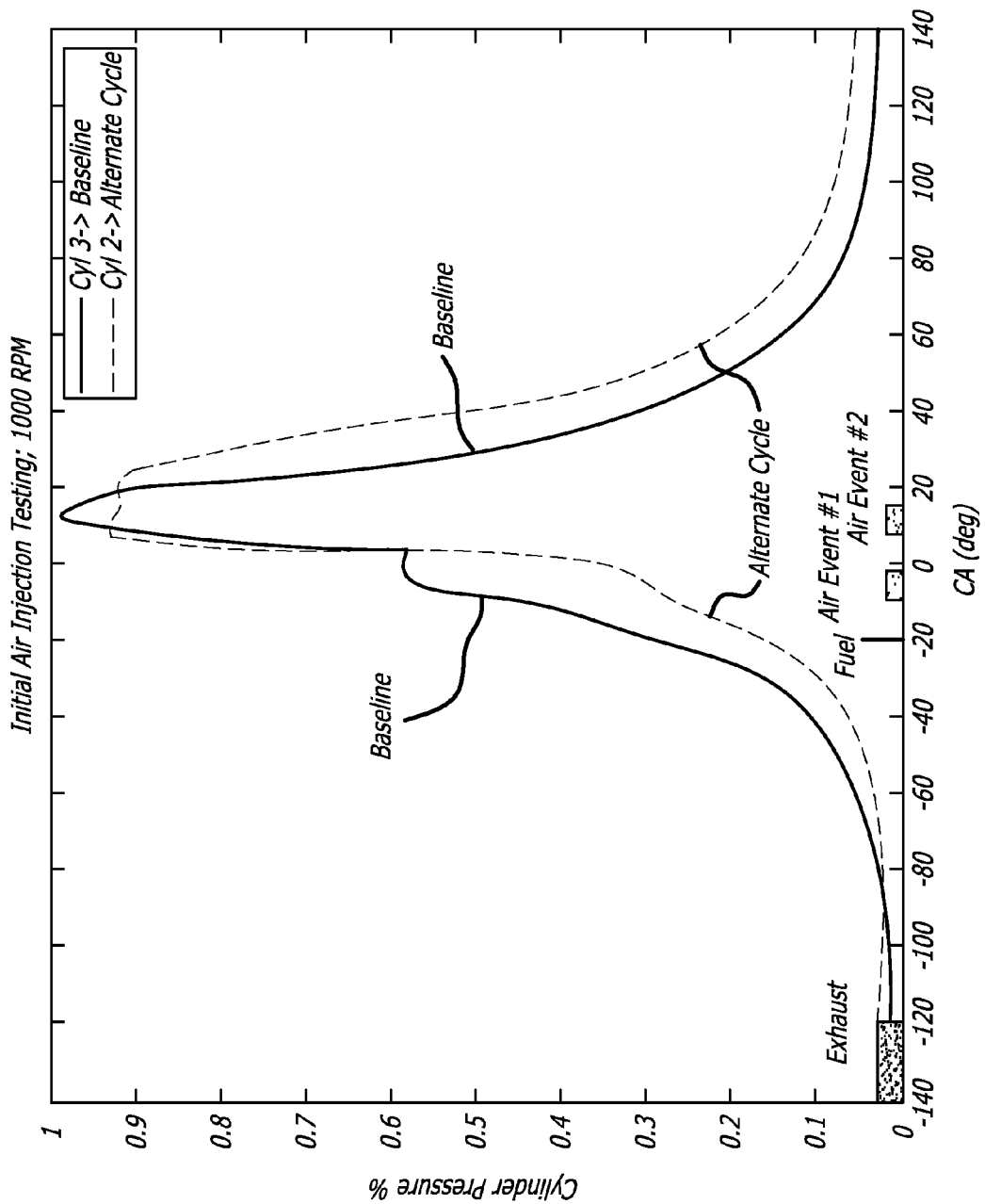
FIG. 13 is a graph illustrating the actual operation of one embodiment of the present invention in comparison to a standard diesel cycle.

Now referring to FIG. 13, a graph illustrating the actual operation of one embodiment of the present invention in comparison to a standard diesel cycle may be seen. These curves present data taken from the actual operation of a multi-cylinder diesel engine wherein the third cylinder was instrumented with a pressure transducer and operated on a conventional diesel cycle, referred to as the baseline, and cylinder number two was also instrumented with a pressure transducer, but operated on an alternate cycle in accordance with an embodiment of the present invention. In that regard, while the Figure goes from −140° to +140° of crankshaft angle relative to top dead center, it should be noted that the baseline operation, that is, the conventional diesel cycle operation in cylinder 3, is a conventional four-cycle diesel operation comprising intake, compression, power and exhaust strokes. The alternate cycle was a two-cycle operation, fundamentally comprised of a compression stroke and a power stroke, thus effectively doubling the number of power strokes for that cylinder.

Air for injection was provided by a separate compressed air source, whereas as previously mentioned, air at the required pressure or pressures in a full implementation would normally be provided by dedicating one or more cylinders of the multi-cylinder engine to compression cylinders. In that regard, the compression cylinders would normally operate as two-cycle cylinders, compression and intake, though might skip cycles dependent on the need for the pressurized air. Also, such cylinders may have a higher compression ratio than the combustion cylinders to expel as much of the compress air at the desired pressure or pressures, and minimize the amount that would be re-expanded during the intake stroke.

In any event, referring again to FIG. 13, it will be noted that for the baseline four-cycle operation, an exhaust cycle and an intake cycle had been completed and compression proceeds. Approximately at top dead center, an injection event occurs, giving a rapid rise to a peak pressure, which then decreases smoothly as the piston moves downward from top dead center. Note that the high cylinder pressure, coupled with incomplete mixing and fuel being in droplet form, implies high cylinder temperatures with high local equivalence ratios generating some soot, and the combination of high temperatures and local low equivalent ratios generating some $NO_X$.

In the alternate cycle of this embodiment of the present invention, the exhaust valves are opened near bottom dead center to trap a predetermined amount of exhaust gas in the cylinder. This exhaust gas, of course, is fully depleted of unburned fuel and because of the cycle about to be explained, is also free of $NO_X$ and soot. When the exhaust valve closes, compression proceeds in the exemplary cycle shown in FIG. 13 to approximately −20° from top dead center, at which crankshaft angle fuel is injected into the exhaust gas in the cylinder. The amount of fuel injected in this example is the full amount for this cycle (as previously mentioned, less than the full amount might be injected, with the rest being injected after top dead center). The fuel is injected into the charge comprising the remaining exhaust from the prior cycle, and is thus injected into fairly high temperature exhaust gasses, that temperature being below ignition temperature. It is, however, sufficiently high to vaporize the fuel, that is, turn the fuel into a gaseous state for better mixing and ultimate avoidance of localized hot spots and regions of high equivalence ratio that otherwise would occur when fuel is injected around top dead center in a conventional diesel cycle.

After the fuel is injected and given some time to convert to the gaseous state, air is injected into the cylinder, again before reaching top dead center, this being labeled air event number one in FIG. 13. The amount of air injected, coupled with the amount of exhaust gas from the prior cycle trapped in the combustion chamber, is carefully controlled so that ignition occurs substantially at top dead center. The peak pressure and peak temperature can be limited by the amount of air injected during the compression cycle so that the percentage of oxygen present is approximately one-half that of fresh air, resulting in combustion occurring along the bold portion of the 10% oxygen curve. That portion is above the ignition temperature, yet well removed from the soot generation equivalence ratio and well below the temperature required to form $NO_X$. Of course, combustion at this time is relatively uniform throughout the charge volume because the fuel has been converted to a gaseous state and well mixed with the available oxygen prior to ignition. Upon a after top center, when the pressure and temperature in the combustion chamber begin to decrease, air event number two occurs, wherein high pressure air is injected directly into the combustion chamber, sustaining combustion as the equivalence ratio is effectively decreased to below unity, allowing complete combustion of the fuel-air charge without generating soot or $NO_X$. Thus, two-cycle operation of this cylinder has been obtained without the presence of local fuel droplets during combustion and without excessive temperatures in the combustion chamber, thereby providing unusually clean operation of the engine.

As previously mentioned, when fuel is injected into the hot residual exhaust gases during the compression stroke, the fuel is converted to the gaseous state before ignition.

While substantially any combustible liquid (under atmospheric conditions) fuel may be used, the engine will be "clean burning" to rival natural gas burning engines. In that regard, the present invention is not limited to the use of liquid fuels, but as mentioned before, may also use gaseous fuels such as natural gas, propane and the like. While these fuels already have a clean burning reputation, use of these fuels in engines in accordance with the present invention may have additional advantages, such as higher efficiency because of the higher compression ratio (to get compression ignition), ability to run on leaner mixtures and the ability to use other fuels in the same engine when necessary or desired.

In any of the embodiments, cycle to cycle correction of the various operating parameters may be made based on the time of ignition and/or other performance parameters for the engine. While mechanical valve control is perhaps not out of the question, use of the present invention on a camless engine, one example of which is disclosed in U.S. Pat. No. 6,739,293 hereinbefore incorporated by reference, is preferred because of the relatively unlimited flexibility in valve actuation and timing. With such flexibility, combustion cylinders may be started on one type of engine cycle, such as a four stroke diesel cycle, and then changed over to two cycle operation as described herein, with or without a skip cycle in either case. The engine might also be started on a "starting" fuel, perhaps for very cold starts, and then changed to run on the normal "running" fuel, which itself may change from time to time based on price, environmental conditions or even engine load requirements or other conditions. Further, the characteristics of the fuel may vary, and of course environmental conditions will change, with the engine control adjusting cycle to cycle to accommodate those changes. By way of example, gasoline may be used, even spark ignition for starting, or in a cycle such as similar to that describe with respect to FIG. 13, with the control of the engine constantly adapting to the octane rating of the specific gasoline being used at any time.

Figure 14:
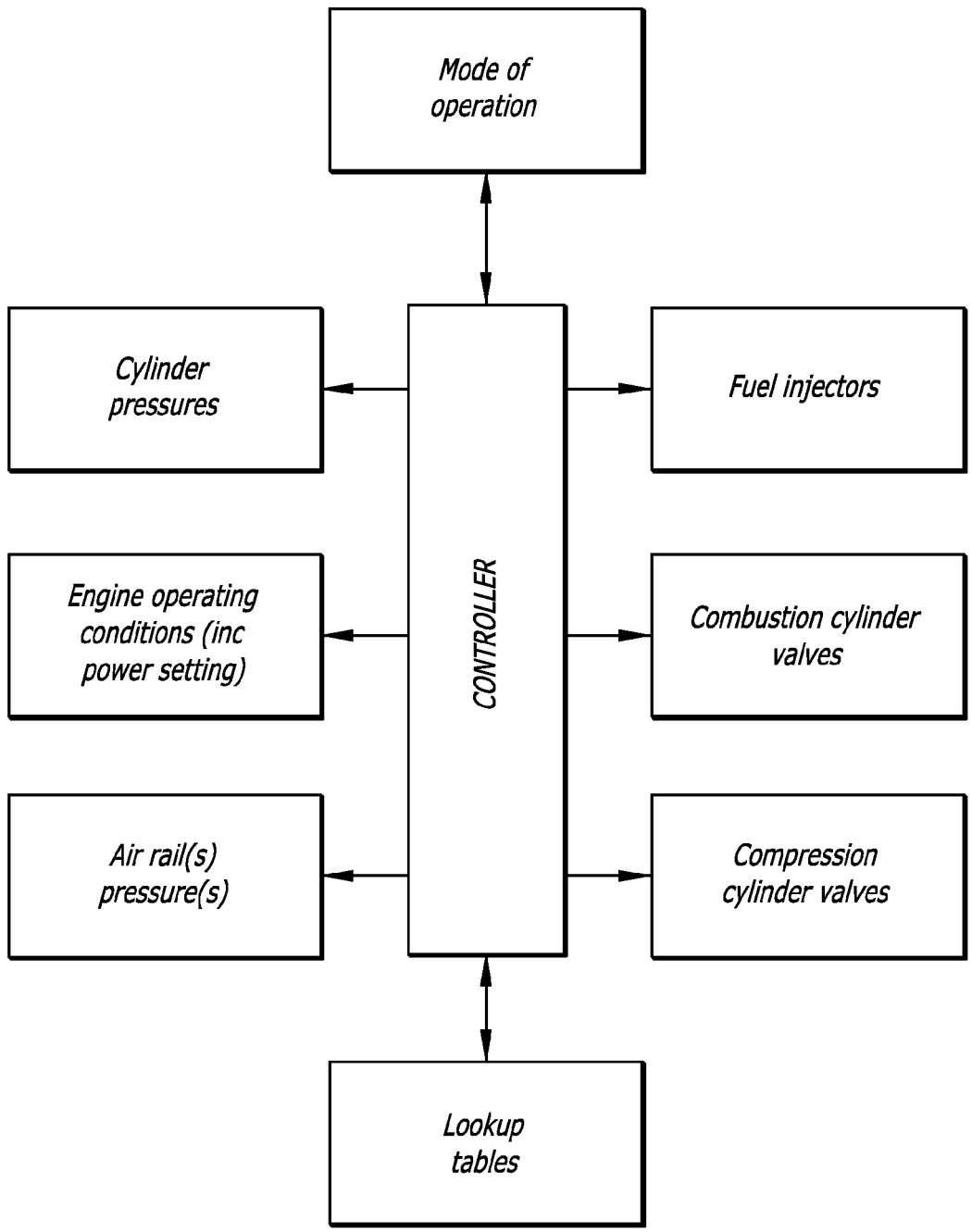
FIG. 14 illustrates an exemplary control system for embodiments of the present invention.

An exemplary control system may be seen in FIG. 14. The controller shown is based on the use of various lookup tables to be responsive to inputs that include compression cylinder pressures, engine operating conditions (temperature, speed, crankshaft angle, power setting, etc.) and air rail(s) pressure(s) to set the mode of operation of the engine and to control the fuel injectors, combustion cylinder valves and the compression cylinder valves. Alternatively, the mode may be manually set by an engine operator. This controller of course is simply exemplary, as various controller configurations may be used.

A preferred cycle of operation is to open the exhaust valve at or near bottom dead center for just long enough, and then close the exhaust valve, to trap a desired amount of exhaust gas in the combustion cylinder for the rest of the cycle to be described. After the exhaust valve is closed, fuel injection into the relatively hot trapped exhaust gas may commence, wherein all fuel to be injected for that cycle is injected. Preferably injection is initiated soon after the exhaust valve is closed, with injection being completed well before the end of the compression stroke, and before ignition, to allow time for the injected fuel to boil off into the gaseous state substantially before top dead center is reached. Just before top dead center, air is injected into the combustion cylinder, preferably in the range of 5 to 15 degrees before top dead center, and more preferably at about 10 degrees before top dead center, and preferably before compression ignition occurs at or near top dead center. This air injection may be considered a sort of pilot injection, ranging from approximately 5% to 15% of the total air to be injected during that cycle, and more preferably about 10% of the total air to be injected that cycle. The amount of fuel injected will be dependent primarily on the power setting of the engine, with the amount of exhaust gas being trapped being at least adequate to evaporate the fuel injected, and the amount of air injected during the compression stroke being controlled to obtain good ignition, yet limit the pressure spike and thus the temperature spike in the combustion cylinder on ignition at or near top dead center to well below temperatures required to form $NO_X$. Then after top dead center, as the pressure in the combustion cylinder begins to significantly decrease, such as approximately 10 degrees to 25 degrees after top dead center, and more preferably about 20 degrees after top dead center, the injection of the remaining air for that cycle begins. This air injection may be pulsed or steady as appropriate, perhaps dependent on engine speed, to sustain combustion to substantially maintain combustion cylinder pressure and temperature through a substantial crankshaft angle after top dead center, such as by way of example, from approximately 20 degrees to 45 degrees, after which air injection is terminated and the power stroke is completed, ready for repeat of the cycle described (or some other cycle, such as a skip cycle).

In the cycle just described, the exhaust gas trapped on closing of the exhaust will be at a temperature well below ignition temperature, but high enough to quickly evaporate the fuel injected after the exhaust valve closes. The amount of exhaust gas trapped together with the amount of air injected during the compression stroke is controlled to obtain compression ignition at or near top dead center, preferably with adjustments being made cycle to cycle for tight control of the operation of the combustion cylinder. The amount of air injected during the compression stroke is of course will be a relatively small percentage of the stoichiometric ratio, but the total amount of air injected during the entire cycle will be equal to or preferably above the stoichiometric ratio to be sure of complete combustion of the fuel. In that regard, note that to the extent that the total air injected during the previous cycle exceeds the stoichiometric ratio, the exhaust gas trapped during the next cycle will have some residual oxygen content. While this excess air should not be so large as to cause excessive pressures and temperatures on compression ignition, in the limit it could negate the need for air injection during the compression stroke and to eliminate any need for more than one pressure of compressed air for injection. While this is not the preferred cycle of operation because it requires all air to be injected at the higher pressure, it still is within the scope of the invention.

In the previous description of the various embodiments of the present invention, and in the following claims, it should be understood that the word valve is used in the general sense, and includes more than one valve unless the context indicates otherwise. Also as used in the foregoing description and in the following claims, the phrase "at or near" includes "at or near either side of" unless the context indicates otherwise. Thus as an example, an event that occurs at or near top dead center would normally mean that the event occurs at or near either side of top dead center.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of operating a piston engine comprising, for at least one cylinder:
   controlling at least one engine valve so that a fuel in the cylinder will be ignited by compression ignition when the piston reaches or is near top dead center during a compression stroke;
   injecting fuel into the engine cylinder during the compression stroke;
   injecting air into the cylinder prior to the end of the compression stroke; and,
   injecting additional air after ignition to sustain combustion of the fuel during a power stroke following the compression stoke;
   the air injection air into the cylinder prior to the end of the compression stroke being at approximately the same engine cylinder pressure as the air injection to sustain combustion of the fuel during the power stroke following the compression stoke;
   whereby the air injections may be from a source of pressurized air at a single pressure.

2. The method of claim 1 wherein no additional fuel is injected after ignition and during the power stroke following the compression stoke.

3. The method of claim 1 wherein additional fuel is injected during the power stroke.

4. The method of claim 1 wherein the controlling at least one engine valve comprises controlling at least one exhaust valve to trap exhaust gases in the cylinder for compression during the compression stroke.

5. The method of claim 4 further comprising injecting air into the cylinder during the compression stroke in an amount limited to limit the combustion temperatures on ignition to below the temperatures for formation of $NO_x$.

6. The method of claim 1 wherein controlling at least one engine valve comprises controlling at least one exhaust valve.

7. The method of claim 1 wherein the compression stroke is followed by the power stroke, followed by repeat of the method in subsequent compression and power strokes, the cylinder thereby operating as a 2-cycle cylinder.

8. The method of claim 1 wherein controlling at least one engine valve so that a fuel being used will be ignited when the piston reaches or is near top dead center during a compression stroke further comprises making adjustments in the control, cycle to cycle, based on what occurred during a previous cycle.

9. The method of claim 8 wherein adjusting the control comprises adjusting the control to accommodate different and changing fuels.

10. The method of claim 1 further comprised of sensing cylinder pressure as an indication of temperature within the cylinder.

11. The method of claim 1 wherein the engine is a camless engine.

12. The method of claim 1 further comprising sensing cylinder pressure as an indication of ignition.

13. The method of claim 1 further comprised of compressing air for injection into the cylinder using at least one other cylinder of the same engine.

14. The method of claim 1 wherein the fuel is a liquid fuel.

15. The method of claim 1 wherein the fuel is a gaseous fuel.

16. A method of operating a piston engine comprising, in a camless engine:
   at or near the end of a power stroke, opening and then closing the exhaust valve of a combustion cylinder to trap a predetermined amount of exhaust gas in the combustion cylinder;
   injecting fuel into the combustion chamber during the following compression stroke soon after the exhaust valve is closed;
   injecting air into the combustion cylinder as the piston approaches top dead center and before compression ignition;
   the amount of exhaust gas trapped in the combustion cylinder and the amount of air injected as the piston approaches top dead center being controlled to obtain compression ignition at or near top dead center without reaching $NO_x$-formation temperatures in the combustion cylinder; and,
   injecting air into the combustion cylinder after ignition and after the piston has passed top dead center to sustain combustion without reaching $NO_x$ formation temperatures and without injection of more fuel;
   the air injection air into the cylinder prior to the end of the compression stroke being at approximately the same engine cylinder pressure as the air injection to sustain combustion of the fuel during the power stroke following the compression stoke;
   whereby the air injections may be from a source of pressurized air at a single pressure.

17. The method of claim 16 wherein injecting air into the combustion cylinder as the piston approaches top dead center comprises injecting air into the combustion cylinder after the injection of fuel terminates.

18. The method of claim 16 wherein the amount of air injected into the combustion cylinder as the piston approaches top dead center comprises 5% to 15% of the total air injected during the compression stroke and the following power stroke.

19. The method of claim 18 wherein the total amount of air injected comprises more than the stoichiometric amount for complete combustion of the injected fuel.

20. The method of claim 16 wherein the piston engine is a multi-cylinder engine and at least one cylinder is used to provide air under pressure for injection.

21. The method of claim 16 wherein the fuel is a liquid fuel.

22. The method of claim 16 wherein the fuel is a gaseous fuel.

23. A method of operating a piston engine comprising:
  at or near the end of a power stroke, opening and then closing the exhaust valve of a combustion cylinder to trap a predetermined amount of exhaust gas in the combustion cylinder;
  injecting fuel into the combustion chamber during the following compression stroke soon after the exhaust valve is closed, the amount of fuel injected being the total amount of fuel to be injected during the compression stroke and the following power stroke;
  injecting air into the combustion cylinder as the piston approaches top dead center and before compression ignition;
  the amount of exhaust gas trapped in the combustion cylinder and the amount of air injected as the piston approaches top dead center being controlled to obtain compression ignition at or near top dead center without reaching $NO_X$ formation temperatures in the combustion cylinder; and,
  injecting air into the combustion cylinder after ignition and after the piston has passed top dead center to sustain combustion without reaching $NO_X$ formation temperatures;
  the air injection air into the cylinder prior to the end of the compression stroke being at approximately the same engine cylinder pressure as the air injection to sustain combustion of the fuel during the power stroke following the compression stoke;
  whereby the air injections may be from a source of pressurized air at a single pressure.

24. The method of claim 23 wherein the fuel is a liquid fuel.

25. The method of claim 23 wherein the fuel is a gaseous fuel.

* * * * *